(12) United States Patent
Henshaw et al.

(10) Patent No.: US 9,266,613 B2
(45) Date of Patent: Feb. 23, 2016

(54) SEATING ARRANGEMENT

(76) Inventors: Robert J. Henshaw, Newnan, GA (US); Suzuko Hisata, Atlanta, GA (US)

( * ) Notice: Subject to any disclaimer, the term of this patent is extended or adjusted under 35 U.S.C. 154(b) by 2 days.

(21) Appl. No.: 13/481,721

(22) Filed: May 25, 2012

(65) Prior Publication Data

US 2012/0298798 A1 Nov. 29, 2012

Related U.S. Application Data

(60) Provisional application No. 61/491,128, filed on May 27, 2011.

(51) Int. Cl.
*B64D 11/06* (2006.01)

(52) U.S. Cl.
CPC ............ *B64D 11/06* (2013.01); *B64D 11/0601* (2014.12); *B64D 11/0606* (2014.12); *B64D 11/0641* (2014.12)

(58) Field of Classification Search
CPC .............. B64D 11/06; B64D 11/0693; B64D 2011/0617; B64D 2011/062; B64D 11/0601; B64D 11/0606; B64D 11/0641
USPC ................ 244/118.6, 118.5, 122 R; 105/345; 297/234, 232, 237, 238
See application file for complete search history.

(56) References Cited

U.S. PATENT DOCUMENTS

| | | | |
|---|---|---|---|
| 1,991,536 A | 2/1935 | Austin | |
| 2,608,366 A | 8/1952 | Jergenson | |
| 3,103,383 A * | 9/1963 | Cannon et al. ................. 297/116 |
| 3,898,704 A * | 8/1975 | Gallaher et al. ................... 5/2.1 |
| 4,735,456 A * | 4/1988 | Haefelfinger .................... 297/62 |
| 4,834,452 A * | 5/1989 | Goodrich ....................... 297/240 |
| 4,863,217 A * | 9/1989 | Fountain ....................... 297/241 |
| 5,062,676 A * | 11/1991 | Mars ........................... 297/338 |
| 5,257,851 A * | 11/1993 | Kanaya .................... 297/344.13 |
| 5,282,665 A * | 2/1994 | Beroth ....................... 297/216.1 |
| 5,740,989 A * | 4/1998 | Daines ........................ 244/118.6 |
| 6,352,309 B1 | 3/2002 | Beroth | |
| 8,118,365 B2 | 2/2012 | Henshaw | |
| 2003/0030306 A1* | 2/2003 | Raczkowski .................. 297/118 |
| 2003/0189370 A1* | 10/2003 | Hemmer et al. ......... 297/344.11 |

(Continued)

FOREIGN PATENT DOCUMENTS

| WO | WO2010084468 | 7/2010 |
| WO | WO2011067286 A2 | 6/2011 |

*Primary Examiner* — Brian M O'Hara
*Assistant Examiner* — Jessica Wong
(74) *Attorney, Agent, or Firm* — Lynda Kouroupis

(57) ABSTRACT

A 3-seat seating grouping is presented that includes a center seat configured for vertical translation from a lower position to a raised position when converted from an upright to an inclined mode. The center seat can be disposed between an aft-facing seating assembly and a fore-facing seating assembly, and be configured to overlap both when in a lie-flat position. Non-overlapping footspace can be shared between a center passenger and an aft-facing passenger. When upright, a center seat can be at the same height as a non-translating aft- or fore-facing seat, reducing loads on a seat track during aircraft take-off. Seats within the 3-seat group can be angled or aligned with respect to cabin longitudinal axis. A plurality of 3-seat groups can be combined in various orientations to span a cabin. Groups can be arranged to mirror each other to maximize seating directed to an aisle.

14 Claims, 21 Drawing Sheets

(56) References Cited

U.S. PATENT DOCUMENTS

| | | | |
|---|---|---|---|
| 2004/0035980 A1* | 2/2004 | McDonnell | 244/118.6 |
| 2008/0007101 A1* | 1/2008 | Abt et al. | 297/240 |
| 2008/0009958 A1* | 1/2008 | Abt et al. | 700/29 |
| 2008/0237398 A1* | 10/2008 | Kennedy et al. | 244/118.6 |
| 2009/0108653 A1* | 4/2009 | Fissette et al. | 297/232 |
| 2010/0308167 A1* | 12/2010 | Hawkins et al. | 244/122 R |
| 2011/0101750 A1* | 5/2011 | Meister et al. | 297/313 |
| 2011/0133030 A1* | 6/2011 | Kennedy et al. | 244/118.5 |

* cited by examiner

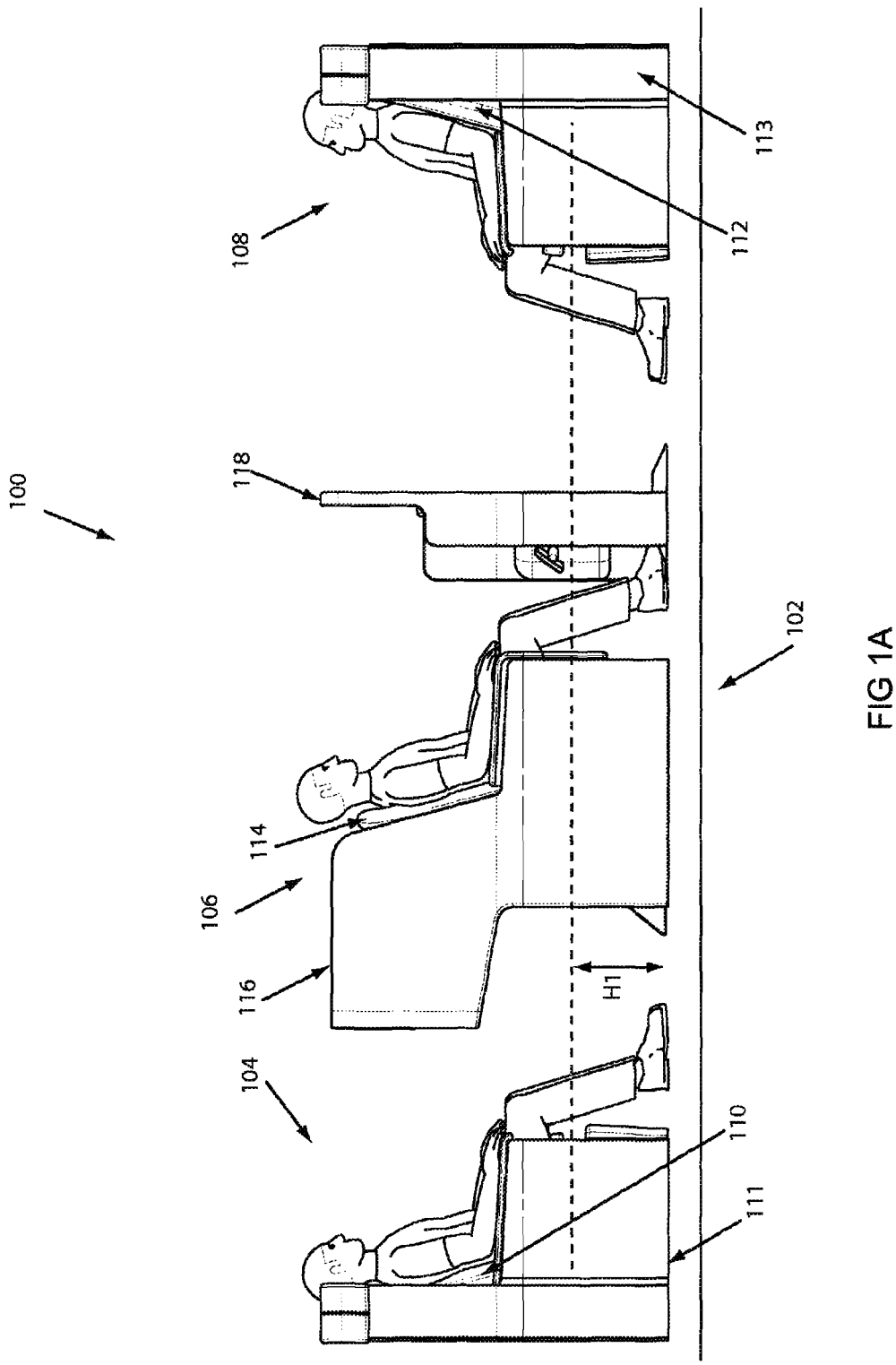

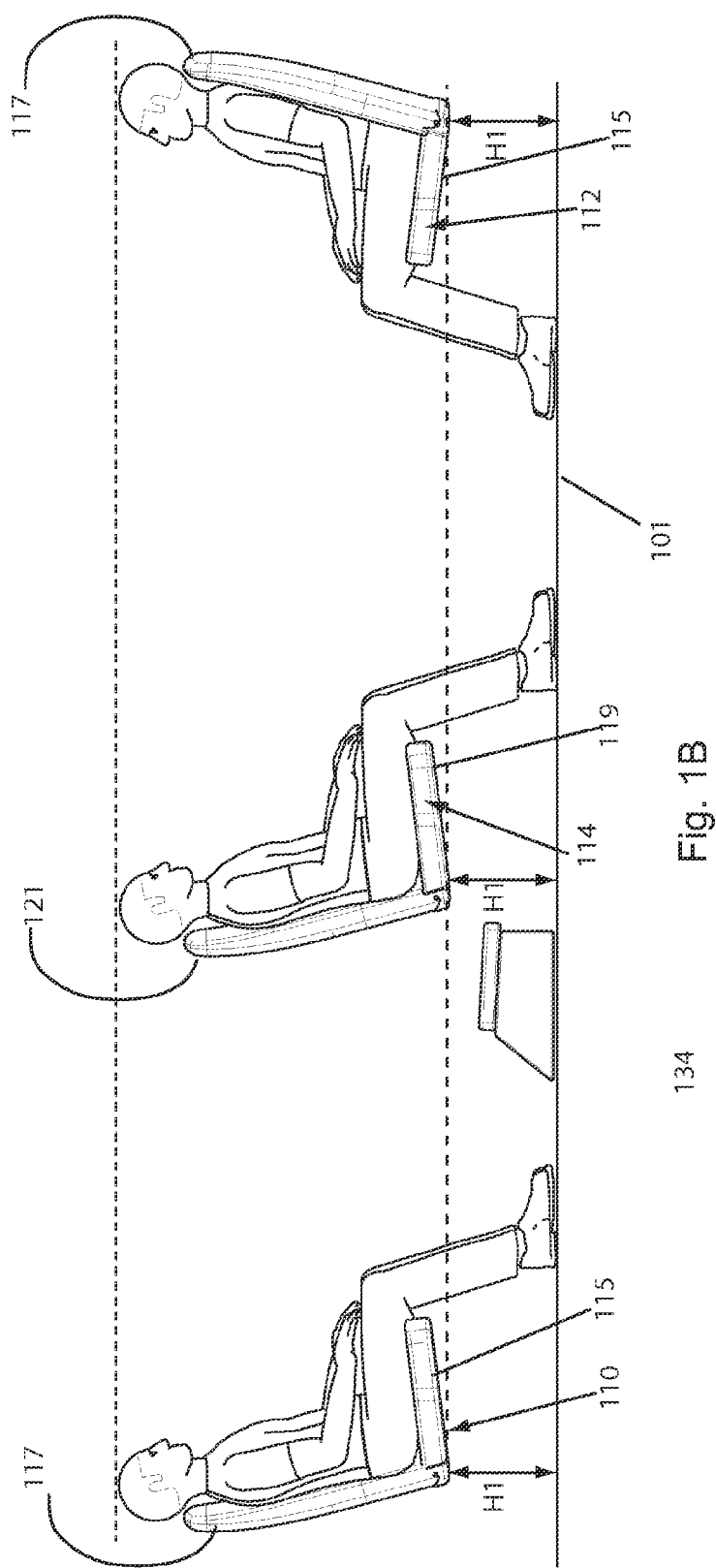

SEATING ARRANGEMENT

CROSS REFERENCE TO RELATED APPLICATIONS

This application claims priority from U.S. Provisional Application No. 61/491,128 filed by Henshaw on May 27, 2011, which is incorporated herein in its entirety by reference.

FIELD OF INVENTION

The present invention relates to seating and seating arrangements for passenger vehicles, and more particularly, to aircraft seating arrangements in which seats can be converted between an upright position and a lie-flat sleeping position.

BACKGROUND OF INVENTION

Optimizing an aircraft seating arrangement can include both maximizing seating as well as attending to passenger needs and comfort. A tension between the two naturally exists, since increasing seating density can often result in provision of narrower seats and shorter leg space that can restrict movement and make a passenger feel cramped. Generally, the more spacious and comfortable a seat, the more an airline can charge for the seat, but the fewer the number of seats that can be provided.

A traditional aircraft seat can include a seat base on which a passenger sits and a seatback against which a passenger leans back. The seatback is typically adjustable to move between a generally upright "takeoff and landing position" and a slightly reclined "traveling" position. Aircraft seats are typically arranged side-by-side in rows transverse to the longitudinal axis of the aircraft with the seats facing forward in the direction of travel. The seat rows are typically spaced apart from one another so that in commercial aircraft, seats are usually arranged having a pitch between 27 and 82 inches to provide legroom between the rows. Longitudinal aisles may be provided that divide the seats into sections. For example, the seating arrangement may include two aisles that divide the seating arrangement into a center section and two side sections to provide improved ingress and egress to the rows and access to emergency exits.

To maximize profit, airlines charge higher fares for upgraded or premium seating. For example, a premium seat may be wider, and recline farther, and be arranged to provide more legroom than a standard seat. Some aircraft are divided into different class cabins, with each having a different seating arrangement. For example, an aircraft may have a higher fare "first class" cabin near the front of the plane and a lower fare "coach" class cabin at the rear of the plane. More recently, airlines have introduced "business class" seating, which can provide more comfort than coach class but remain less expensive than first class seating.

Seats that are convertible between a "takeoff and landing" position to a "lie-flat" sleeping position have been introduced to allow the seats to be used as "beds." These seats have proven popular on long haul and international flights during which a passenger may desire to sleep aboard the aircraft. While lie-flat seating can provide additional comfort to passengers, and higher revenue to airlines, lie-flat seating occupies additional space, limiting the number of seats that a fuselage can accommodate. For example, when seats are oriented at an angle relative to a vehicle floor, a lie-flat seating arrangement typically has a seat pitch of about 58 to 63 inches, significantly greater than the pitch of coach class seating which generally ranges from 27 to 34 inches. Angled lie-flat seating can place one passenger's head over the feet of the passenger directly behind him or her. Non-angled lie-flat seating typically has a pitch of 76 to 82 inches, and may rely on an alternative arrangement of seats to facilitate efficient utilization of space in the aircraft.

Some attempts to optimize a lie-flat seating arrangement have included angling the seats in a horizontal plane in a "chevron" style in an attempt to increase seating density while providing lie-flat seating. Other attempts have included overlapping portions of the seats vertically, placing a passenger's feet underneath the head of another passenger seated in front of him. For example, an arrangement can include seats that recline at an angle so that the feet of a passenger in a rearward seat extend below the head of a reclined passenger reclined in front. Other arrangements include seats that are placed back-to-back lengthwise, with alternate seats placed substantially above the passageway floor with the remaining seats below the passageway floor, so that the back of the upper seat reclines over the back of the adjacent lower seat.

More recently, a seating arrangement has been proposed that includes a raised seat that overlaps two lower seats when reclined a lie-flat position. By exploiting generally unused vertical space seating density can be increased to maximize passenger capacity while providing fully reclining seating.

While fit for their intended purposes, most prior art arrangements are plagued by several drawbacks and disadvantages. For example, some prior art seating arrangements configure the seat of a first passenger to cover the head of a second passenger, providing a generally undesirable configuration. Other prior art arrangements fail to efficiently utilize horizontal and/or vertical space, decreasing the cost effectiveness of the arrangement. Raised seating arrangements generally result in greater loads being applied to the floor, necessitating the use of heavier and more expensive support structures to satisfy federal airline safety requirements, particularly those that regulate take-off conditions. In addition raised seating may impede provision of overhead storage bins, and reduce cargo space for passenger carry-on luggage.

SUMMARY OF INVENTION

In an exemplary embodiment, aircraft seating is arranged to include a fore-facing seating assembly, an aft-facing seating assembly, and a center seating assembly, positioned between the fore-facing and aft-facing seating assemblies. The fore-facing, aft-facing, and center seating assemblies are configured to form a three-seat grouping. The center seating assembly comprises a seat configured to vertically translate from a lower take-off position to a higher position when converted from an upright to a lie-flat mode. In an example embodiment, when a translating seat is in an upright or take-off position, its seat pan is at substantially the same height above the cabin floor as that of an upright fore-facing or aft-facing seat, which may not be configured for vertical translation. However, when the a translating seat is in a raised lie-flat position, its seat pan can be elevated to height around 25 inches above the floor.

In an exemplary embodiment, at least one of the fore-facing and aft-facing assemblies of the three-seat grouping includes a seat convertible between an upright and a lie-flat position. When extended in a lie-flat position, a portion of the fore-facing assembly underlaps a portion of the center seating assembly. For example, a bed comprising the fore-facing seating assembly can underlap a bed comprising the center seating assembly. In an exemplary embodiment, at least one center seat is oriented at an angle with respect to its linear dimension. By way of example, the fore-facing, center and aft-facing seats can be angled. An angled arrangement can shorten the overall length of the three-seat grouping, allowing greater seating density. In an example embodiment, a footrest divider structure provides separation between the center and aft-facing seating assemblies, and further provides a foot compartment for the aft-facing passenger. The footrest divider structure can provide center and aft-facing passengers non-overlapping footspace.

In an example embodiment, two three-seat groupings can be combined to form a six-seat module that allows access to all seating assemblies, conserves space and efficiently provides seating throughout an aircraft fuselage. An example six-seat module includes a pair of adjacent fore-facing seats, a pair of adjacent aft-facing seats, and, positioned between the pairs of fore- and aft-facing seats, a pair of center seats configured for vertical translation from a lower position to a higher position when converted from an upright to a lie-flat position, wherein at least one of the center seats is angled with respect to its linear dimension along an aircraft longitudinal axis. In an example embodiment, all seats in the six-seat module are angled with respect to an aircraft longitudinal axis. One or more of the fore- and aft-facing seats, for example all of the seats in the 6-seat grouping can be configured to transition from an upright to a lie-flat mode. The six-seat module can include a footrest structure that provides a separate footwell or foot compartment associated with each of the aft-facing seats. In an example embodiment, the footrest structure can further provide a lower leg rest associated with a center seats. A six-seat configuration can include a single integrated footrest partition or two separate footrest partitions between center and aft-facing seats.

An example seating arrangement can include a six-seat grouping comprising two fore-facing seats, two center vertically-translatable seats, and two aft-facing seats in which one or more seats is arranged in alignment with its linear dimension, e.g. in alignment with the longitudinal axis of an aircraft. A seat can be configured to angle passengers in a lie-flat position to conserve space and allowing high-density lie-flat seating arrangements. Alternatively, a seat can be configured to allow a passenger to lie in alignment with an aircraft longitudinal axis. A six-seat module can include first and second footrest partition structures that can be arranged to allow unobstructed ingress and egress for a center seat passenger. Alternatively, an integrated double footrest partition structure can be included.

An example aircraft seating assembly can be configured for vertical translation and can include a seat coupled to a seat elevation and support structure (SESS). The seat can comprise a seatback coupled to a seat bottom. The SESS can support the seat and comprise a translation means configured to vertically translate the seat from a lower take-off position to a higher lie-flat position. The translation means can cooperate with a seat pan articulation member to elevate the seat above the aircraft floor. In a lie-flat mode the seat can be tilted to compensate for aircraft nose up cruise angle. When returned to an upright mode, the seat can be translated back to its original lower disposition. The seat can be translated horizontally as well as vertically when transitioned between the upright and lie-flat modes.

BRIEF DESCRIPTION OF THE DRAWINGS

FIG. 1A depicts an example 3-seat grouping seating arrangement.

FIG. 1B depicts an example 3-seat grouping seating arrangement.

DETAILED DESCRIPTION OF EXAMPLE EMBODIMENTS

Figure 1C:
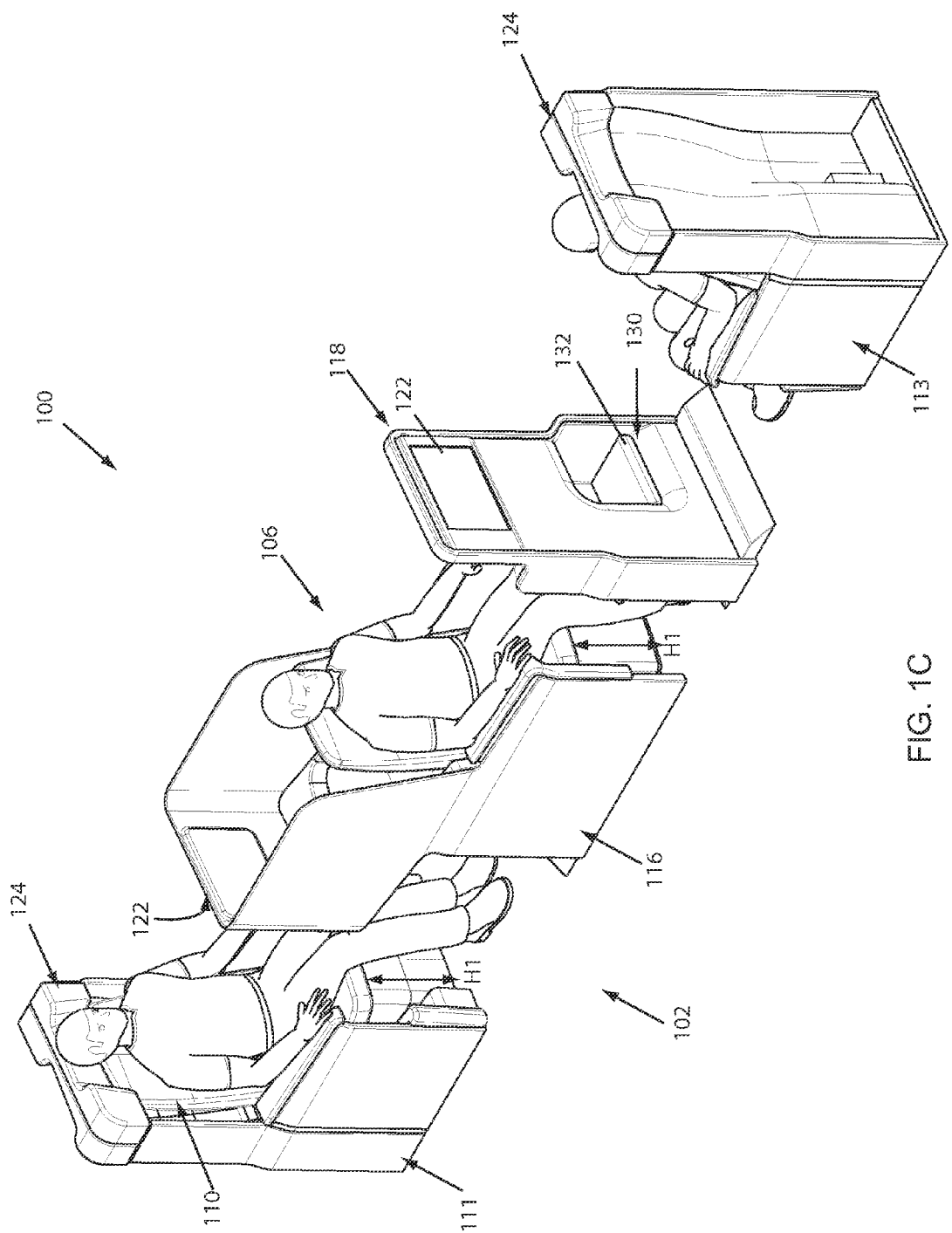
FIG. 1C depicts an example 3-seat grouping seating arrangement.

As required, exemplary embodiments of the present invention are disclosed herein. These embodiments are meant to be examples of various ways of implementing the invention and it will be understood that the invention may be embodied in alternative forms. The figures may not be to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention. The terms "fore" and "aft" are used merely for orientational purposes in reference to the particular exemplary embodiments shown in the drawings. Furthermore, the term lie-flat may mean substantially flat which could be angled and not necessarily horizontal.

For purposes of teaching, and not limitation, the exemplary embodiments disclosed herein are discussed in the context of an Airbus A-330 or A-340 aircraft, Airbus A-380 and Boeing 777 aircraft. However, the present invention is applicable to other aircraft and passenger vehicles. Furthermore, seats and seating arrangements described herein are not limited to aircraft, but may be adapted for use in other vehicles as well.

Referring to the Drawings, wherein like numerals represent like elements throughout the several views, FIGS. 1A-1H depict an example seat arrangement 100. The seat arrangement 100 includes a three-seat configuration 102 that includes a fore-facing seating assembly 104, a center seating assembly 106, and an aft-facing seating assembly 108. The fore-facing seating assembly 104 comprises a fore-facing seat 110 and a support shell 111. The fore-facing seat 110 comprises a seat bottom 115 and a seatback 117. The aft-facing seating assembly 108 comprises an aft-facing seat 112 and a support shell 113. The aft-facing seat 112 also comprises a seat bottom 115 and a seatback 117. The center seating assembly 106 comprises a vertically translating seat 114, configured to translate from a lower position to a higher position when moving from an upright to a lie-flat mode, and a center shell support structure 116. The vertically translating seat 114 comprises a seat bottom 119 and a seatback 121. When the vertically translating seat 114 is converted from an upright mode to a lie-flat mode, the seat bottom 119 is raised from a lower height above a cabin floor to a higher height above a cabin floor. FIG. 1A shows a side view of the arrangement 100. FIG. 1B shows a side view with portions of the structures 111, 113, 116 removed. As shown in FIG. 1B, seat bottoms 115 and 119 are disposed at a height H1 above a cabin floor 101 when the seats 110, 112, and 114 are configured in an upright take-off mode.

Figure 1D:
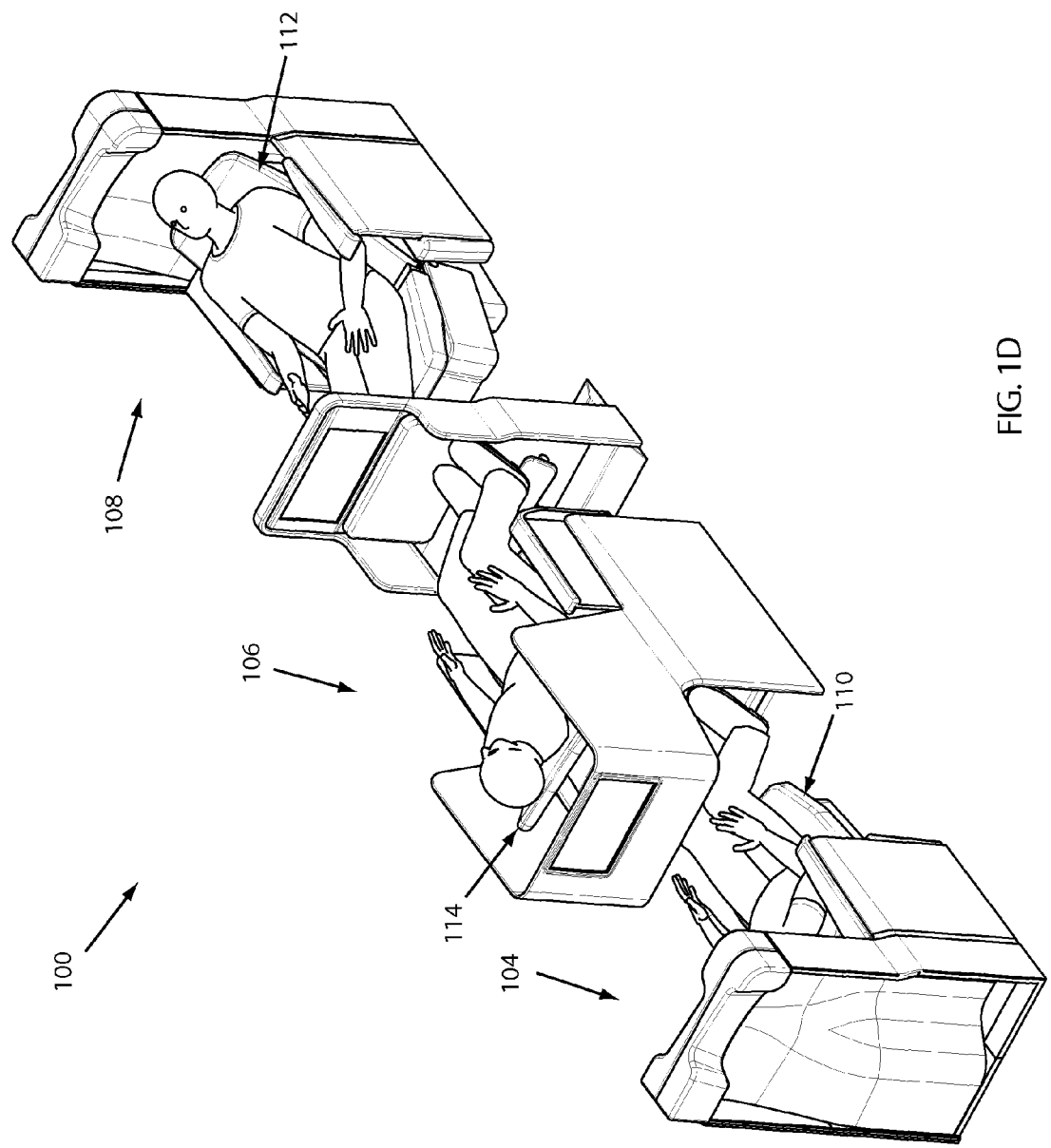
FIG. 1D depicts an example 3-seat grouping seating arrangement.
Figure 1E:
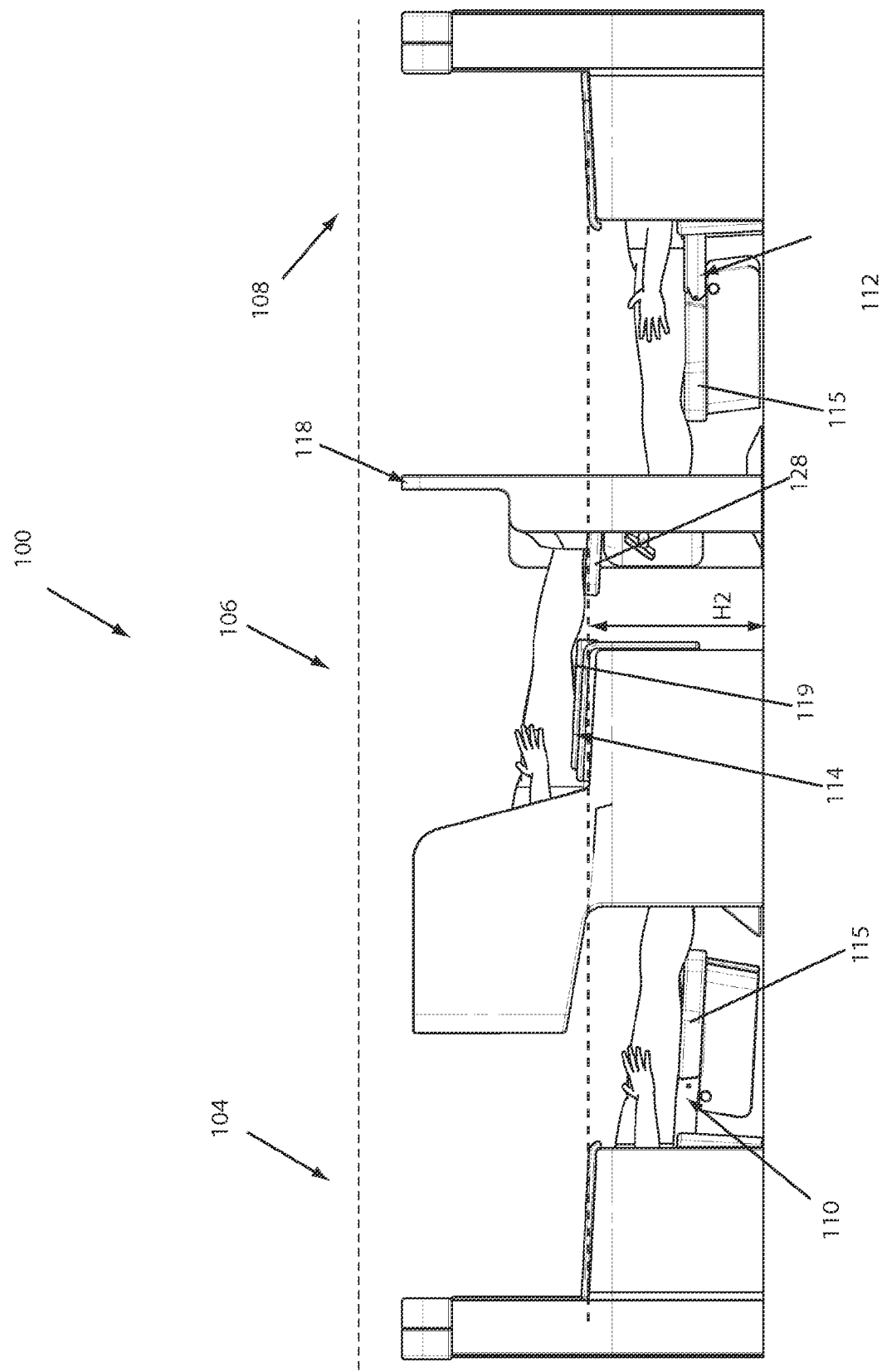
FIG. 1E depicts an example 3-seat grouping seating arrangement.
Figure 1F:
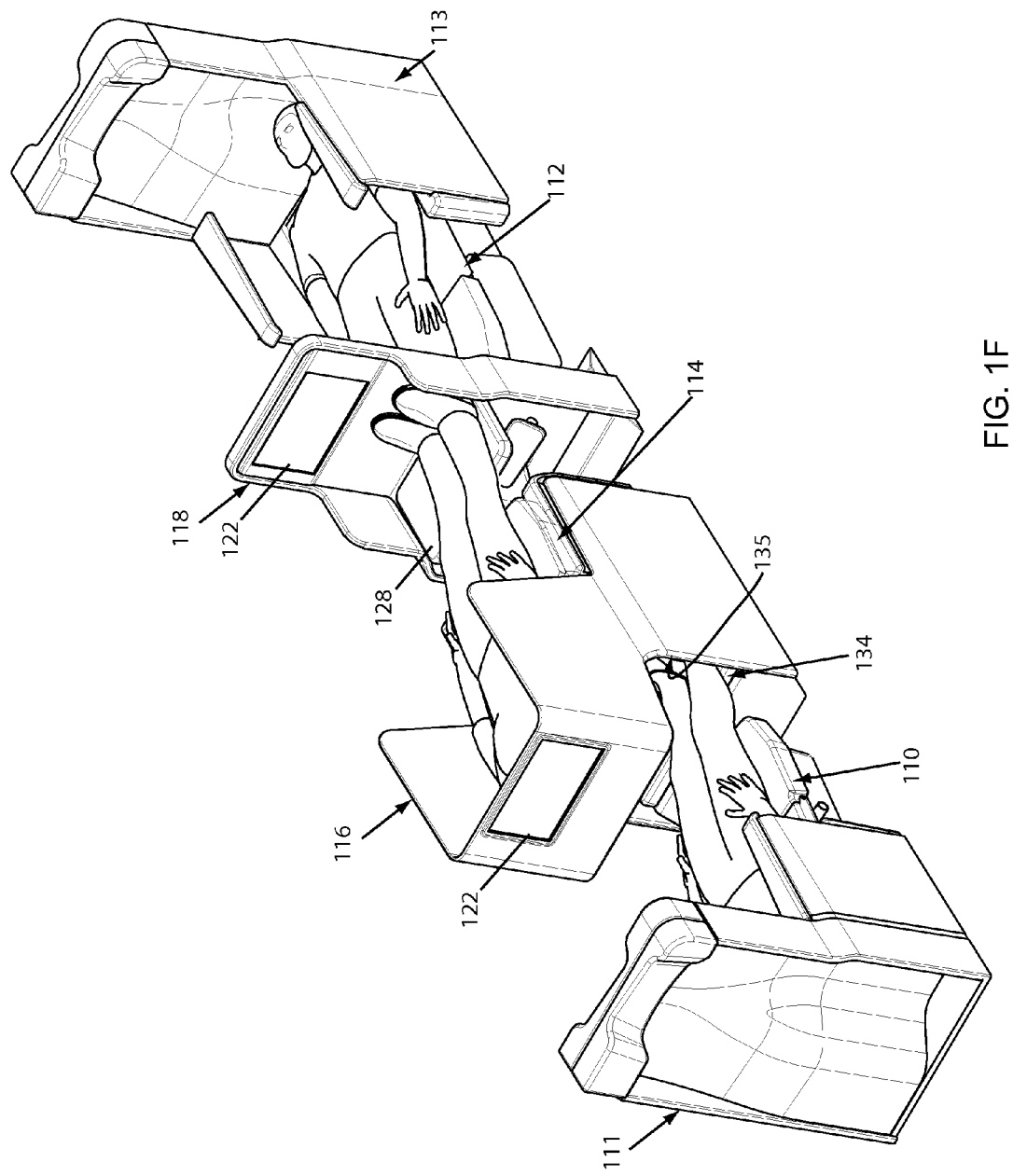
FIG. 1F depicts an example 3-seat grouping seating arrangement.

The center shell structure 116 can be configured to receive a reclined translating seat 114. In addition, as shown in FIG. 1F, a footwell 135 can be provided at the center shell structure 116 to receive the feet of a reclined occupant of seat 110. The center shell structure can also accommodate a footrest 134 to support feet of a seat 110 occupant. In addition to providing separation and privacy between passengers in seat 110 and translating seat 114, the center shell 116 can be configured with various features for a seat 110 occupant, such as, but not limited to, an in-flight entertainment center 122, and safety equipment and other accessories (not shown). In FIGS. 1A-1C, the center, fore- and aft-facing seats 114, 110, 112 are in an upright mode. As shown in the drawings, the seat bottom 119 of the center translating seat 114 in an upright mode can be disposed at about the same height as the seat bottom 115 of the fore-facing seat 110 and aft-facing seat 112 that are not configured for upward vertical translation from an upright mode to a lie-flat mode. As a result, an arrangement can exploit vertical space without imposing undesirable loads on a seat track during takeoff.

The seating arrangement 100 can include a footrest partition structure 118 disposed between the center seat 114 and the aft-facing seat 112. The footrest partition structure 118 can provide separation between center and aft-facing passengers. In addition, it can provide a footrest 128 for the feet and lower legs of a reclining seat 114 occupant. The footrest partition structure 118 can also include a foot compartment 130 for the feet of an aft-facing passenger. A cushion 132 or other foot support can be disposed within the foot compartment 130.

As discussed in U.S. application Ser. No. 12/409,442 filed on Mar. 23, 2009 by Henshaw, and PCT Application No. PCT/US2009/001823 filed on Mar. 24, 2009, both of which are incorporated herein in their entirety by reference, the aft- and fore-facing seating assemblies 108, 104, as well as the center seating assembly 106 include seats configured to be convertible between a sitting position and a lie-flat position. As shown in FIG. 1D a fore-facing, aft-facing, or center vertically translating seat can be variably positioned between an upright and a lie-flat orientation in accordance with an occupant's preference. As shown in FIGS. 1D-1H, as the center translating seat 114 is reclined, it is raised so that an occupant is lifted to a height above the passengers in the fore- and aft-facing seats 110, 112. FIG. 1E shows the seat bottom 119 of the center seat disposed at a height H2, and the footrest 128 disposed at or near the height H2. Referring to FIGS. 1A and 1E it can be seen that the footrest 128 is disposed at a height higher than the height H1 of the seat bottom 119 when the center translating seat 114 is in an upright position, and it can be seen that the seat bottom 119 is disposed at a height H2, higher than H1 when the seat 114 is configured in a lie-flat mode. An upper headrest 124 and a lower headrest 126 can provide head support for fore-facing and aft-facing occupants in upright, partially reclined, and lie-flat positions.

Figure 1G:
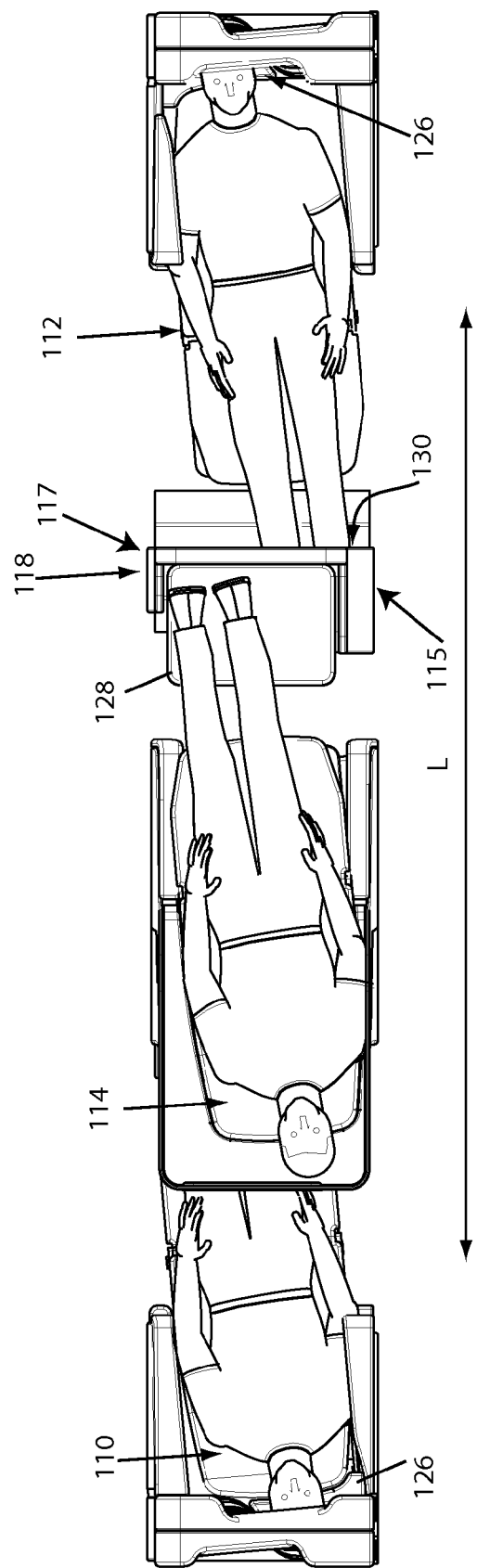
FIG. 1G depicts an example 3-seat grouping seating arrangement.
Figure 1H:
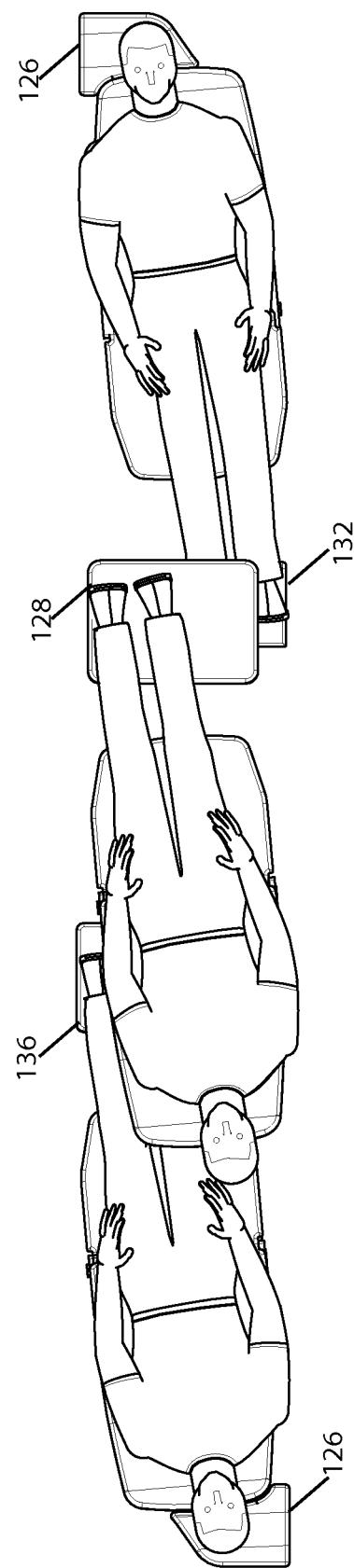
FIG. 1H depicts an example 3-seat grouping seating arrangement.

In an example embodiment, the fore-facing seating assembly 104 is configured to underlap the seating assembly 106 when in a lie-flat mode. The spacing of the fore-facing seating assembly 104 from the center seating assembly 106 is configured to provide sufficient leg room for an occupant when the seat 110 is in a sitting position, while allowing a bed provided by the seating assembly 104 to underlap the seat 114 in the sleeping position. Vertical translation of the center seat 114 allows it to overlap the fore-facing seating assembly 104 in a lie-flat position, saving space so that higher density seating can be provided. However, since the seat bottom 119 of the seat 114 can be at a lower position during take-off and landing maneuvers, force on a seat track in when the seat 114 is in an upright position is less than that imposed by raised seats fixed at an elevated height. A plurality of three-seat configurations can be combined with one or more other seat configurations, for example, but not limited to, a single seat or a two-seat configuration, to efficiently and comfortably provide an overall seating layout throughout an aircraft fuselage. In an example arrangement, as shown in FIG. 1G, one or more seats 110, 112, 114 can be angled with respect to the linear dimension of the aircraft as denoted by line L. As can be seen in FIG. 1G, the foot compartment 130 can be disposed at a first lateral side 115 of the footrest partition structure 118, and configured to cooperate with the aft-facing seat 112 to angle an aft-facing occupant. The center seating assembly 106 can be configured to cooperate with the footrest partition structure 118 to direct the feet of a reclined center seat 114 to a second lateral side 117 of the footrest partition structure, thereby angling a reclined center passenger with respect to the linear dimension L. As can be seen in FIG. 1G, the footrest partition structure 118 is configured to accommodate feet of a reclined center passenger and a reclined aft-facing passenger in a non-overlapping relationship.

Figure 2A:
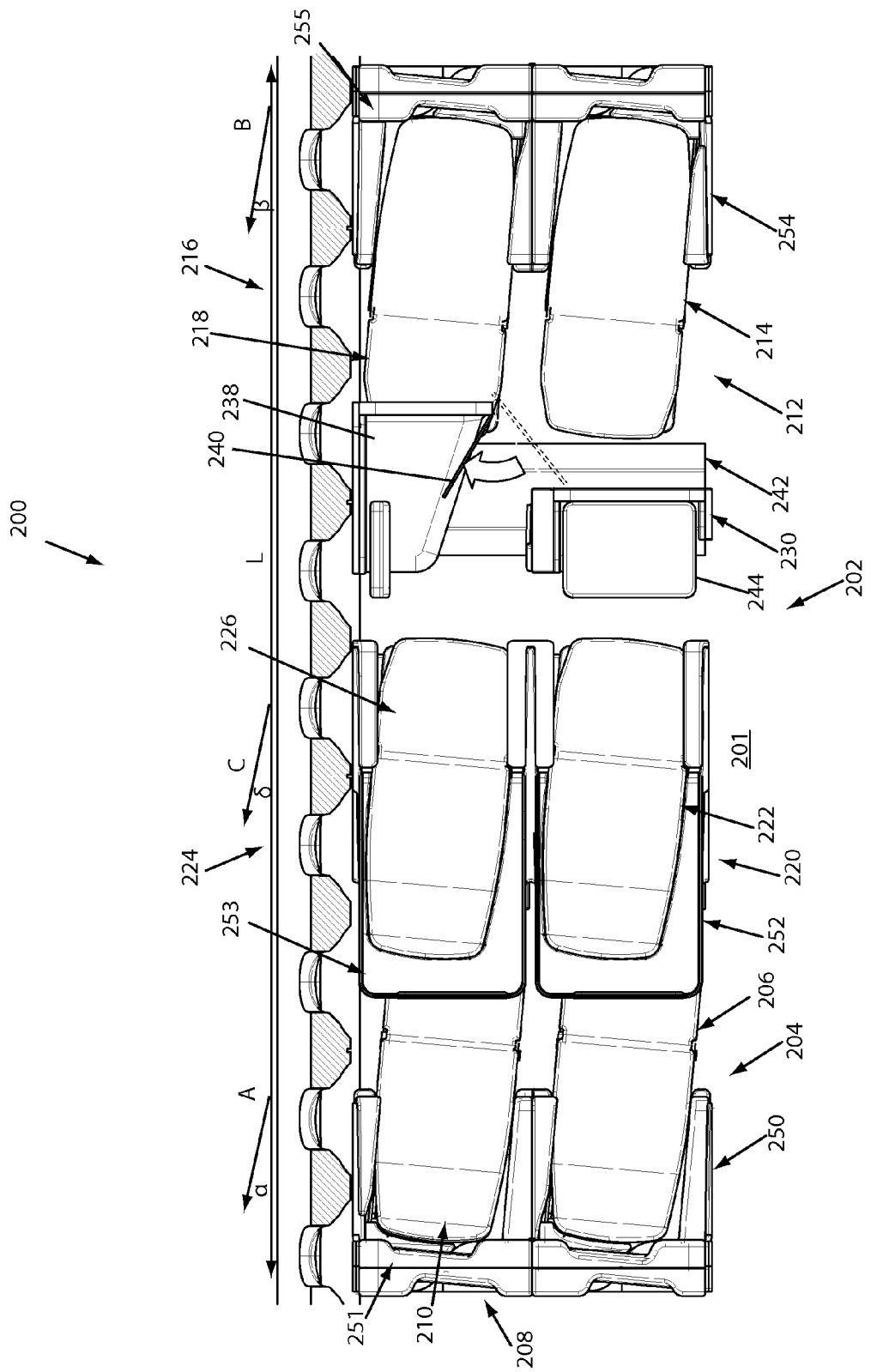
FIG. 2A depicts an example 6-seat grouping seating arrangement.
Figure 2B:
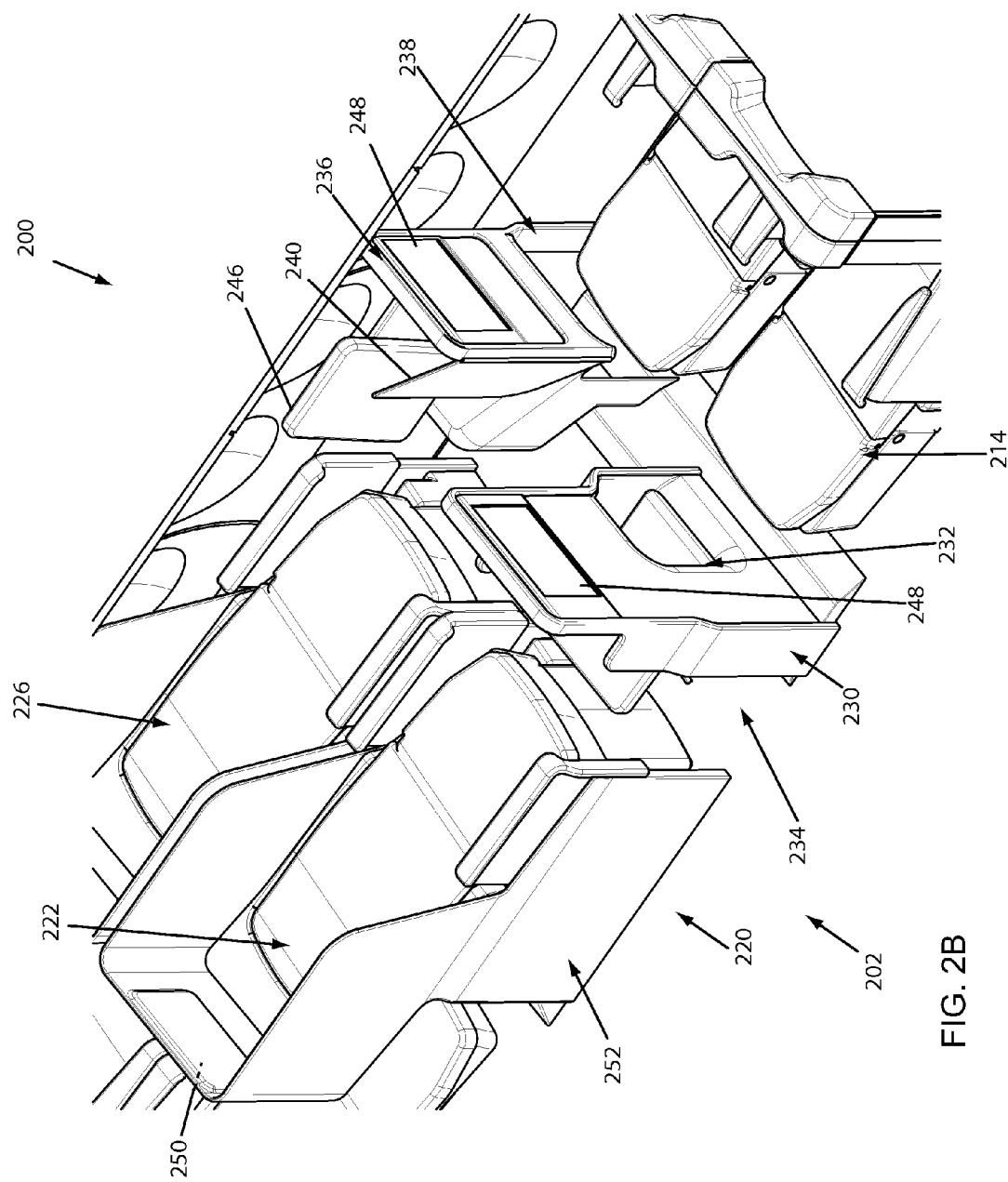
FIG. 2B depicts an example 6-seat grouping seating arrangement.

FIGS. 2A, 2B show a seating arrangement 200 that includes a 6-seat grouping 202. By way of example, but not limitation, the 6-seat grouping 202 can be formed by the combination of two adjacent 3 seat-groups 102. The grouping 202 comprises a first fore-facing seating assembly 204 that includes a seat 206 configurable between an upright and lie-flat position, and a second fore-facing seating assembly 208 that includes a seat 210 configurable between an upright and a lie-flat position. The 6-seat grouping 202 further includes a first aft-facing seating assembly 212 comprising a seat 214 configurable between an upright and a lie-flat position, and a second aft-facing seating assembly 216 comprising a seat 218 configurable between an upright and lie-flat mode. Situated between the fore- and aft-facing seating assemblies 204, 206, is a first center seating assembly 220 that comprises a vertically translating seat 222 configurable between an upright and lie-flat position, and a second center seating assembly 224 that includes a vertically translating seat 226.

The first and second fore-facing seating assemblies 204, 208 can be disposed at a sufficient distance behind the first and second center seating assemblies 220, 224, to provide sufficient leg room for upright occupants, while allowing underlapping when occupants are in a lie-flat position. As can be seen from FIG. 2B, the center seats 222, 226 are elevated when placed in a lie-flat position.

In an exemplary embodiment, one or more of the seats 206, 210, 214, 218, 222, 226 can be angled with respect to the linear dimension of the aircraft, reducing the overall linear dimension of the six-seat grouping 202. In the example embodiment 200, all seats are angled. A line L represents the longitudinal axis or linear dimension of the aircraft. The arrow A indicates the orientation of the fore-facing seat 210 at an angle α with respect to the line L. Similarly, arrow B shows the orientation of the aft-facing seat 214 at an angle β with respect to the line L, and arrow C shows the orientation of center seat 226, at an angle δ with the line L. In an exemplary embodiment, the angles α, β, δ are identical. Values for the angles α, β, δ can vary, by way of example, but not limitation, in the range from 0° to 15°, but it has been found that an angle between 4° and 11° is desirable, as it can efficiently balance space utilization, seating density and passenger comfort. With angled seating, the 6-seat grouping 202 has a shorter overall length than a configuration in which seats are linearly aligned with an aircraft's longitudinal axis, thus providing an arrangement that conserves passenger cabin space within a vehicle. By way of example, but not limitation, an arrangement based on a plurality of 6-seat groupings can have a seat pitch of around 55 to 60 inches.

In addition, angling of the seating assemblies can facilitate efficient allocation of footspace, enabling the passengers in the center and aft-facing seating assemblies to share space in a way that provides sufficient legroom and comfort as well as privacy and separation. In an example embodiment, a footrest partition structure 230 can be disposed between the center assembly 220 and the aft-facing assembly 212. The footrest partition 230 can be configured with a foot compartment 232 for receiving the feet of a seat 214 occupant when the seat 214 is in a lie flat position. Angling the center seat 222 and aft-facing seat 214 can provide additional space adjacent the foot compartment 232 for a foot area 234 that can be used by an upright occupant of the seat 222. Footspace can be shared laterally, in a non-overlapping manner, between center seat 222 and aft-facing seat 214 occupants, while the foot compartment 232 provides separation between the occupants. A second footrest partition structure 236 having a foot compartment 238 can be disposed between the second center seating assembly 224 and the second aft-facing seating assembly 216.

In a 3-seat grouping a footrest partition structure can be configured with a single foot compartment associated with a single aft-facing seating assembly. In a 6-seat grouping, two adjacent footrest partition structures can be configured to provide two separate foot compartments for two aft-facing occupants. Alternatively, an integrated double footrest partition structure can provide a foot compartment for each of the two aft-facing seats 214, 218. In an example embodiment, the footrest partition structure 230 and foot compartment 232 can have a shorter length than the footrest partition structure 236 and foot compartment 238. Accordingly, a passenger of the first aft-facing seat 214 who is in a lie-flat position can have less of his body received at the foot compartment 232, than a passenger of the second aft-facing seat 218 has received by the foot compartment 238. The difference in footrest partition dimensions opens up space for passenger ingress and egress.

The footrest partition structure 236 can include a movable privacy panel 240 configured to move from a closed position to an open position as shown by the arrow in FIG. 2A. In an example embodiment, the privacy panel 240 can be hingedly coupled to the footrest partition structure 236. The privacy panel 240 can allow a center seat passenger to exit his seat easily when an adjacent center passenger is in a lie-flat position, regardless of the position of an aft-facing passenger. For example, a passenger seated in the seat 226 can swing the privacy panel 240 to an open position to step down to a floor panel 242 and out to an aisle 201. If the aft-facing seat 214 is in a lie-flat position, a seat 226 passenger can step over the extended legs of a prostrate passenger to exit.

In addition to providing a foot compartment for an aft-facing passenger, privacy for the center and aft-facing passengers, and ingress/egress passage for a center occupant, a footrest partition structure can also provide support for a center passenger. The footrest partition structure 230 can provide a footrest 244 for use by passenger of seat 222; and the footrest partition structure 236 can provide a footrest 246 for supporting lower legs and feet for an occupant of the seat 226. In an exemplary embodiment, the footrests 244, 246 can be moved between stowed and extended positions. As illustrated, the deployed footrest 244 can be used in association with a center seat 222 in a lie-flat position to form a bed for a center reclining passenger. At the same time, an upright passenger can use an extended footrest as a tray table or shelf that can support various articles without infringing an occupant's personal space. In an example embodiment, the footrest 246 is hinged to the foot compartment 238 to allow easy stowage.

The footrest partition structures 230, 236 can include additional features as well. For example, an in-flight entertainment (IFE) center 248 can be provided for an occupant of the aft-facing seats 214, 218, and a second IFE 248 can be provided for a passenger of the second aft-facing seat 218. In similar fashion, an IFE 250 can be provided for each of the center seats 222, 226. Other accessories, such as but not limited to, trays, pockets, safety equipment, etc. (not shown) can be disposed at the footrest partitions 230 and 236. In addition the footrest partition 230, 236 can provide support for seated passengers when the center seats 222,226 are not in a lie-flat mode. For example, a foot prop (not shown) for supporting the feet of an upright or partially reclined center occupant can be provided below the footrests 244, 246. In an example embodiment, the foot panel 242 can support feet of an upright passenger in the seat 214.

In a like manner, a six-seat grouping can include a combination of separate individual shell structures, shell as shells 250, 251 for fore-facing seats 206, 210 respectively, shells 252, 253 for center vertically translating seats 222, 226 respectively, and shells 254, 255 for aft-facing seats 214, 218 respectively. Alternatively, integrated double shell structures for the various seats can be employed. As shown in FIG. 2B, the shells 252, 253 can provide an IFE 250 for seats 206, 210, and may also provide trays, pockets, safety equipment and other accessories not shown. A footrest partition structure and a support shell can be arranged perpendicular to the longitudinal axis of the aircraft, so that seats that are angled with respect to the longitudinal axis of an aircraft can also be angled with respect to a shell structure or footrest partition.

Figure 3A:
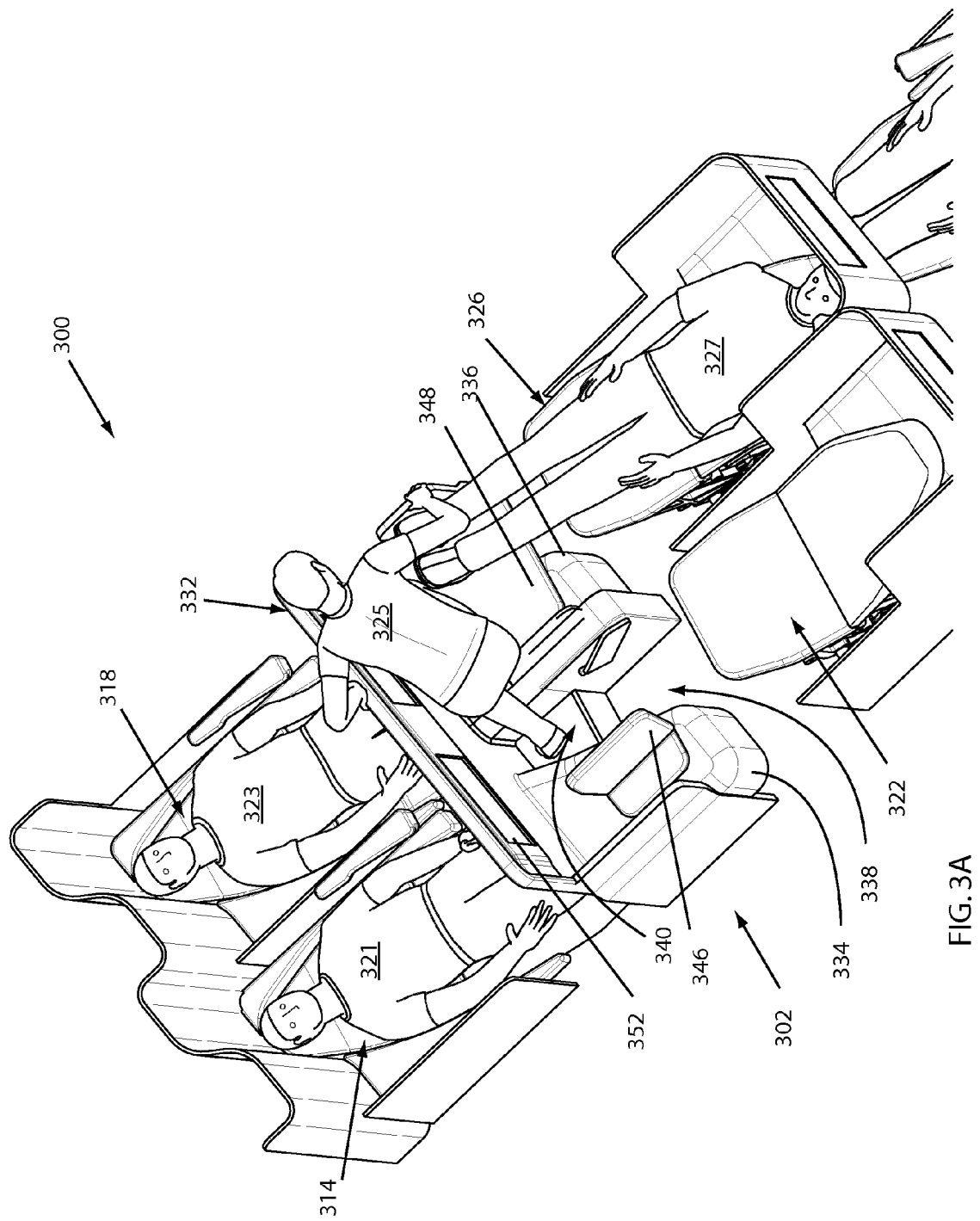
FIG. 3A depicts an example 6-seat grouping seating arrangement.
Figure 3B:
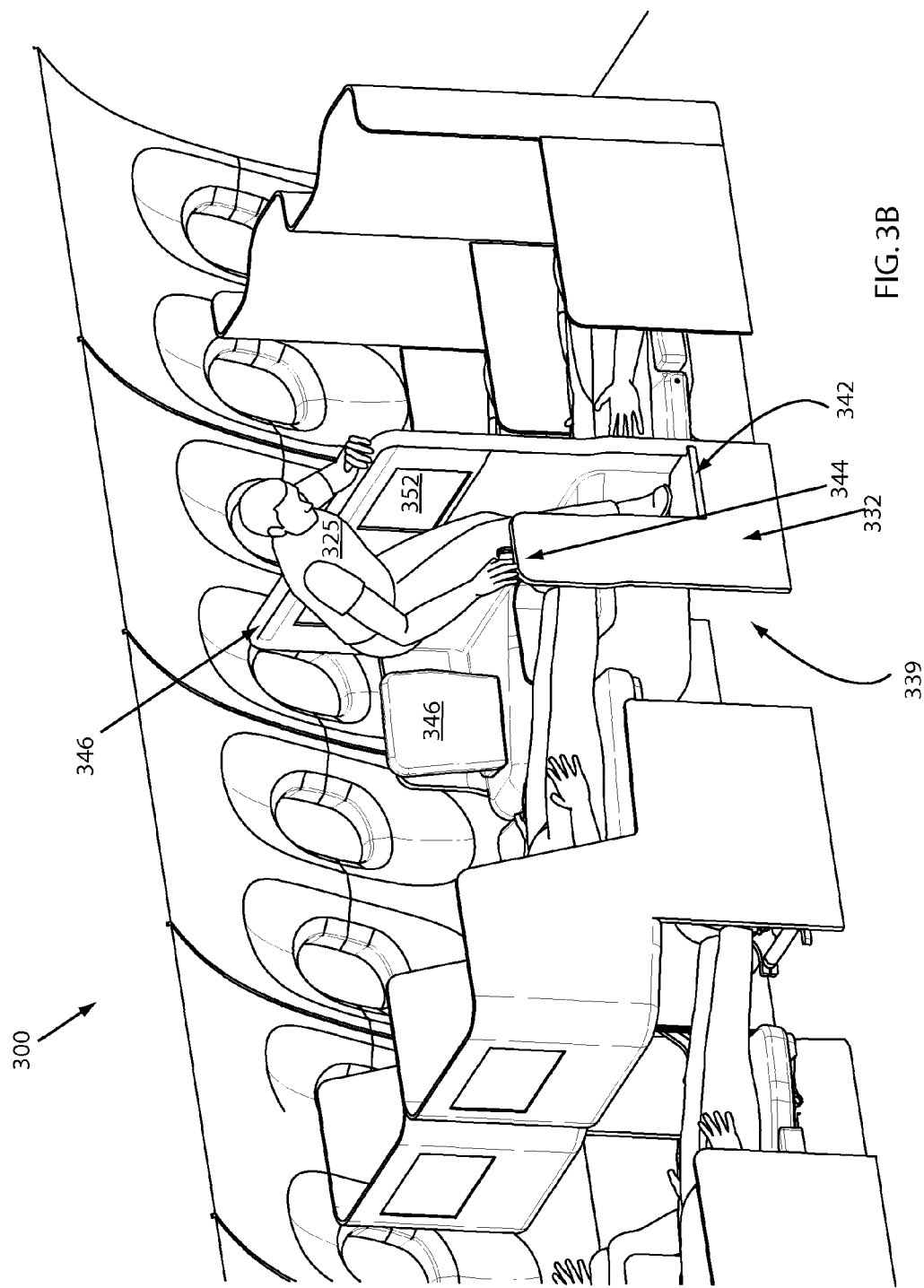
FIG. 3B depicts an example 6-seat grouping seating arrangement.

FIGS. 3A, 3B show an example arrangement 300 that includes a six-seat grouping 302 having an integrated footrest partition structure 332 configured with a first foot compartment 334 and a second foot compartment 336. The first foot compartment 334 is configured for accommodating the feet and lower legs of a passenger 321 of an aft-facing seat 314 in a reclined position. The second foot compartment 336 is configured for a passenger 323 in a reclined aft-facing seat 318. The aft-facing seat 314 can cooperate with the foot compartment 334 to form a lie-flat bed for the passenger 321. However, while extending out to the center passenger side of the footrest partition structure 332, the foot compartments 334, 336 do not pose a hindrance to passengers seated in a center seating assembly.

As explained previously, a foot compartment, such as the foot compartments 334 and 336, can be disposed in such a manner that a passenger seated in a center seat 322, 326 has a sufficient foot area 338, 339 respectively for resting his feet when seated in an upright position. In addition, a foot compartment can be disposed in such a manner that a passenger seated in a center seat can enter or exit his seat without having to step over, or otherwise disturb, an adjacent center passenger. In addition, he need not step over an occupant of an aft-facing seat who is fully reclined.

The footrest partition 332 can provide an inner step 340 and an outer step 342 that enable a passenger 325 of the seat 322 to exit to the other side of an occupant 327 of the center seat 326. For example, the center seat 322 can be positioned along a window side of an aircraft, while the center seat 326 is adjacent an aircraft aisle. The inner and outer steps 340, 342 facilitate easy aisle access for an occupant of the center seat 322, particularly for those times that the center seat 326 is occupied.

As shown in FIGS. 3A, 3B, the passenger 325 that wishes to exit to the opposite (aisle) side of the fully reclined passenger 327 simply steps on the inner step 340, over the foot compartment 336, to the outer step 342 and down to an aircraft floor. The footrest partition 332 can include a grab handle portion 344 that the passenger 325 can grasp for stability during the step-over process. In an example embodiment, the footrest partition structure 332 is configured with a height that is tall enough to provide adequate privacy between upright center and aft-facing seats, while still allowing the passenger 325 to use an upper edge 346 for balance and stability as necessary during the step-over process.

In an exemplary embodiment, a seat of an arrangement can be variably inclined between an upright take-off position and a fully reclined or lie-flat position, as a passenger desires. As discussed earlier, an example embodiment can include a seat configured for vertical translation from a lower height to a higher height above a vehicle floor. At the lower position, a vertically-translating seat is at or around the height of surrounding non-translating seats arranged in the aircraft. For example, a translating seat in an upright position can have a seat pan at generally the same height above the aircraft floor as that of a fore-facing or aft-facing seat that is not configured for elevation above the vehicle floor. Thus at take-off or landing, when a vertically translating seat is in a lower, upright position, the load on the seat tracks can be comparable to that of conventional non-translating seats. However, when moved from an upright position to a fully reclined lie-flat position, a translating seat can be moved upward to a height of around 25 inches above the ground, so that lie-flat seating behind the translatable seat can underlap the elevated lie-flat seat, shortening the linear dimension of a seating arrangement and enabling higher density lie-flat seating. Seating that is fixed at an elevated height above a cabin floor generally requires a heavy support structure to satisfy federal aviation safety requirements. By employing a seat that can be raised to overlap seating behind it, but lowered for take-off and landing operations, a translating seat can be lighter than fixed elevated seating, but still provide advantages inherent to overlapping arrangements.

Figure 4A:
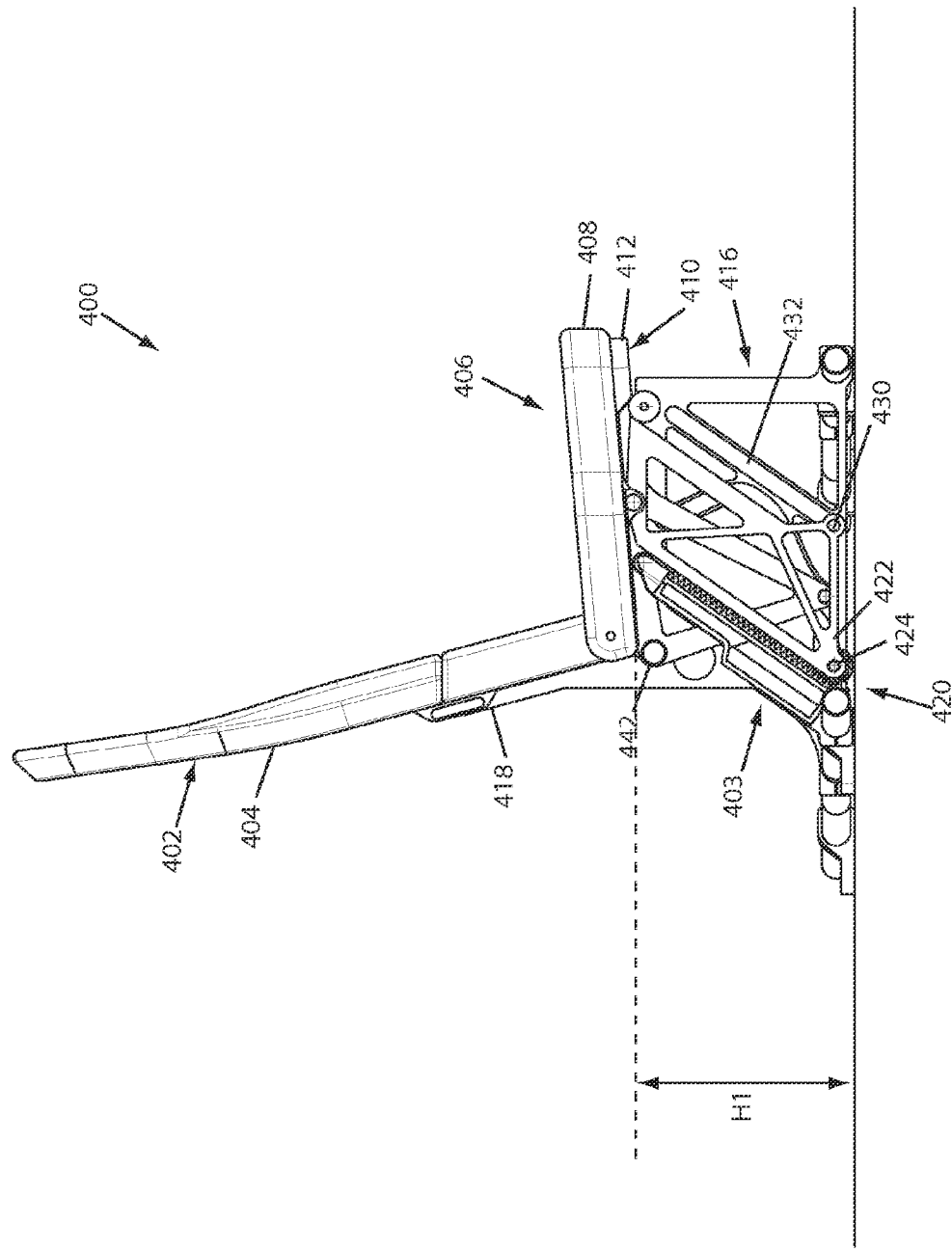
FIG. 4A depicts an example vertically translating seating assembly.
Figure 4B:
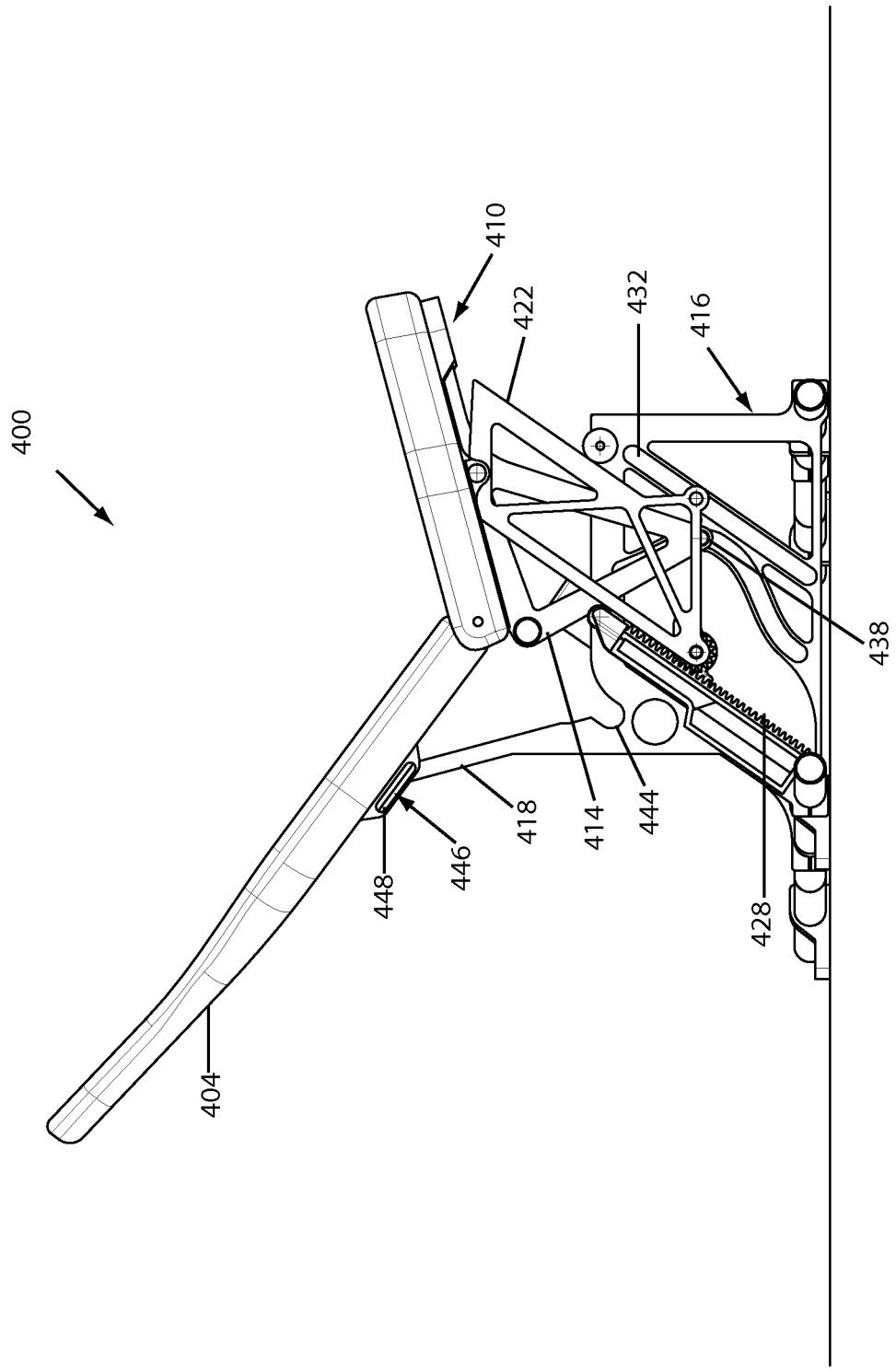
FIG. 4B depicts an example vertically translating seating assembly.

FIGS. 4A-4D show an example translating seating assembly 400. The translating seating assembly 400 can comprise a seat 402 coupled to a seat elevation and support structure (SESS) 403. FIG. 4A shows the seat 402 in an upright position, such as that required for aircraft take-off or landing. The seat 402 comprises a seat back 404, configured for supporting a passenger's back, coupled to a seat base 406. In an exemplary embodiment, the seat base 406 is positioned at a height of around 18 inches, a typical height for a standard aircraft seat, one at which seats are usually tested for compliance with Federal Aviation Administration (FAA) and European Aviation Safety Agency (EASA) standards and specifications. FIG. 4A shows the seating assembly 400 in an upright take off mode with the seat bottom 408 disposed at the lower height H1.

The seat base 406 can comprise a seat bottom 408 for supporting the thighs and buttocks of a passenger, and a seat pan 410 that can underly and support the seat bottom 408. In an example embodiment, the seat bottom 408 can comprise a seat cushion. The seat pan 410 can include a seat support portion 412 configured to undergird the seat bottom 408, and an articulation member 414 configured to couple the seat pan 410 to the SESS 403 and facilitate vertical movement of the seat 402 from a lower upright position to a higher lie-flat position.

The SESS 403 can comprise a frame 416 that can include a seat back support member 418 and a translation means 420. The frame 416 can be coupled to the vehicle floor and can be configured to provide support for both the seat 402 and the translation means 420. In an exemplary embodiment, the frame 416 can support the seat 402 at a height of around 18 inches above the floor, at generally the same height as conventional non-translating seats. The seat back support member 418 can be coupled to the seat back 404 and provide a means of support while the seat back 404 is pivoted during the translation process.

In an exemplary embodiment, the translation means 420 can comprise a linear actuator. For example, the translation means 420 can include an extension structure 422, a rack and pinion cog 424, and a stepper motor within stepper motor housing 426 that can coordinate to elevate the seat 402 to a higher position above an aircraft floor. In an example embodiment, the extension structure 422 can be configured for movement along the frame 416, for example along a rack portion 428 of the frame 416. A stepper motor working in tandem with a worm gear within gear housing 427, can rotate a shaft within shaft housing 429 that is coupled to the rack and pinion cog 424, so that it engages and moves along the rack portion 428. As a result, an extension structure lower roller 430, which can remain fixed to the extension structure 422, can move along an extension structure guide path 432 in the frame 416. An extension structure upper roller 434, coupled to the frame 416 can assist in the upward movement of the extension structure 422 while providing stability during the translation process.

In an exemplary embodiment, the articulation member 414, which can couple the seat 402 to the frame 416, can facilitate the vertical translation process. For example, a seat pan pivoting mount 436 can be seated at the extension structure 422, so that as the extension structure 422 moves upward, the seat support portion 412 undergirding the seat bottom 408 pivots, tilting the seat bottom 408. In addition, the articulation member 414 can be coupled to a cam follower bearing wheel 438 which can roll along a cam follower track 440 in the frame 416. The cam follower track 440 can control the angle at which the seat base 406 is tilted during the vertical translation. In a take-off and landing position, to secure the seat 402 to the SESS 403, a locking mechanism 442 can cooperate with a locking cradle 444 in the frame 416 to lock the seat pan 410 to the frame 416, which can be secured to an aircraft seating track. Locking the seat pan 410 to the frame 416 can obviate the need for the seat articulation member 414 to withstand the 16 g test required for aircraft seat certification.

Figure 4C:
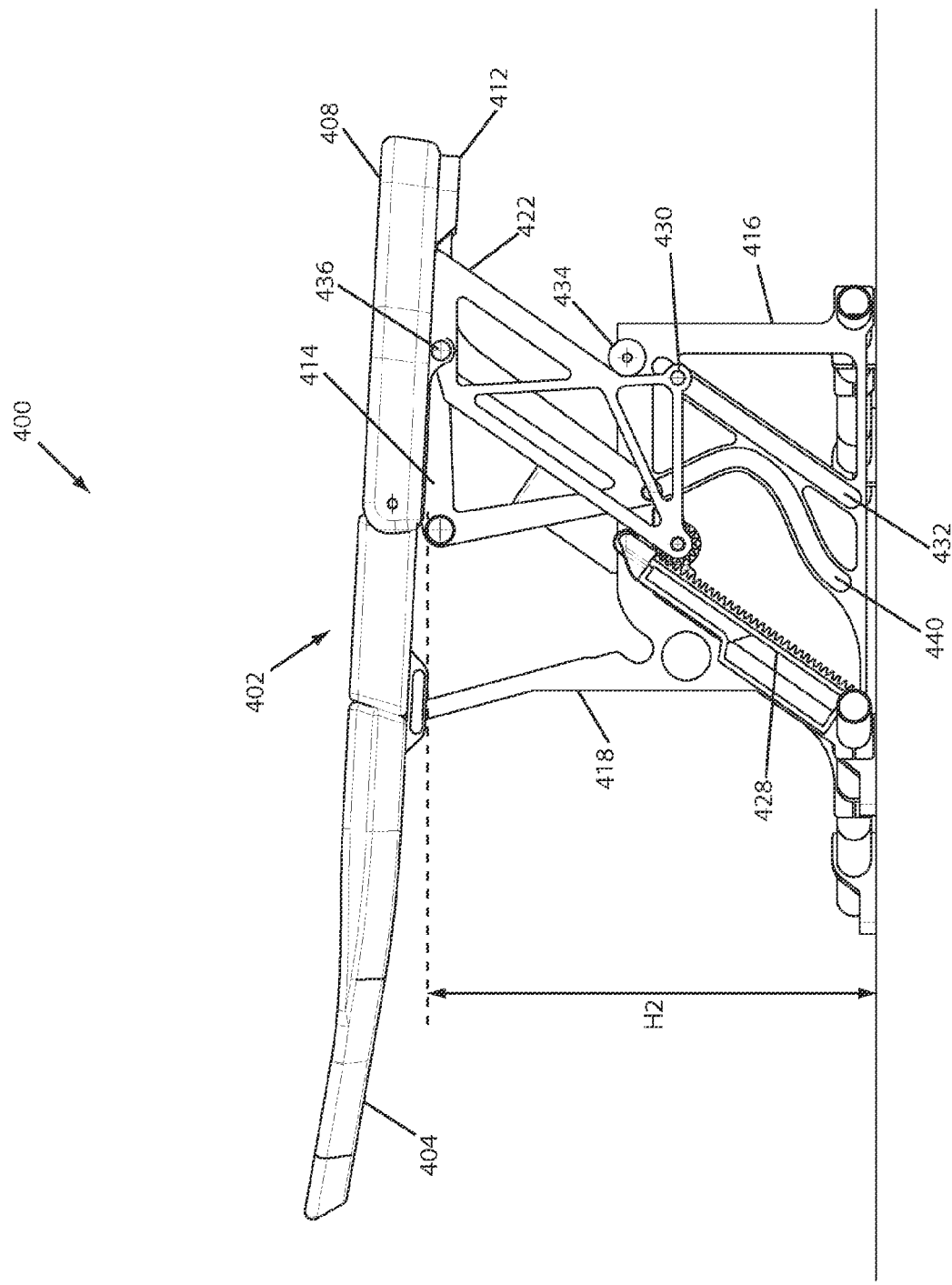
FIG. 4C depicts an example vertically translating seating assembly.
Figure 4D:
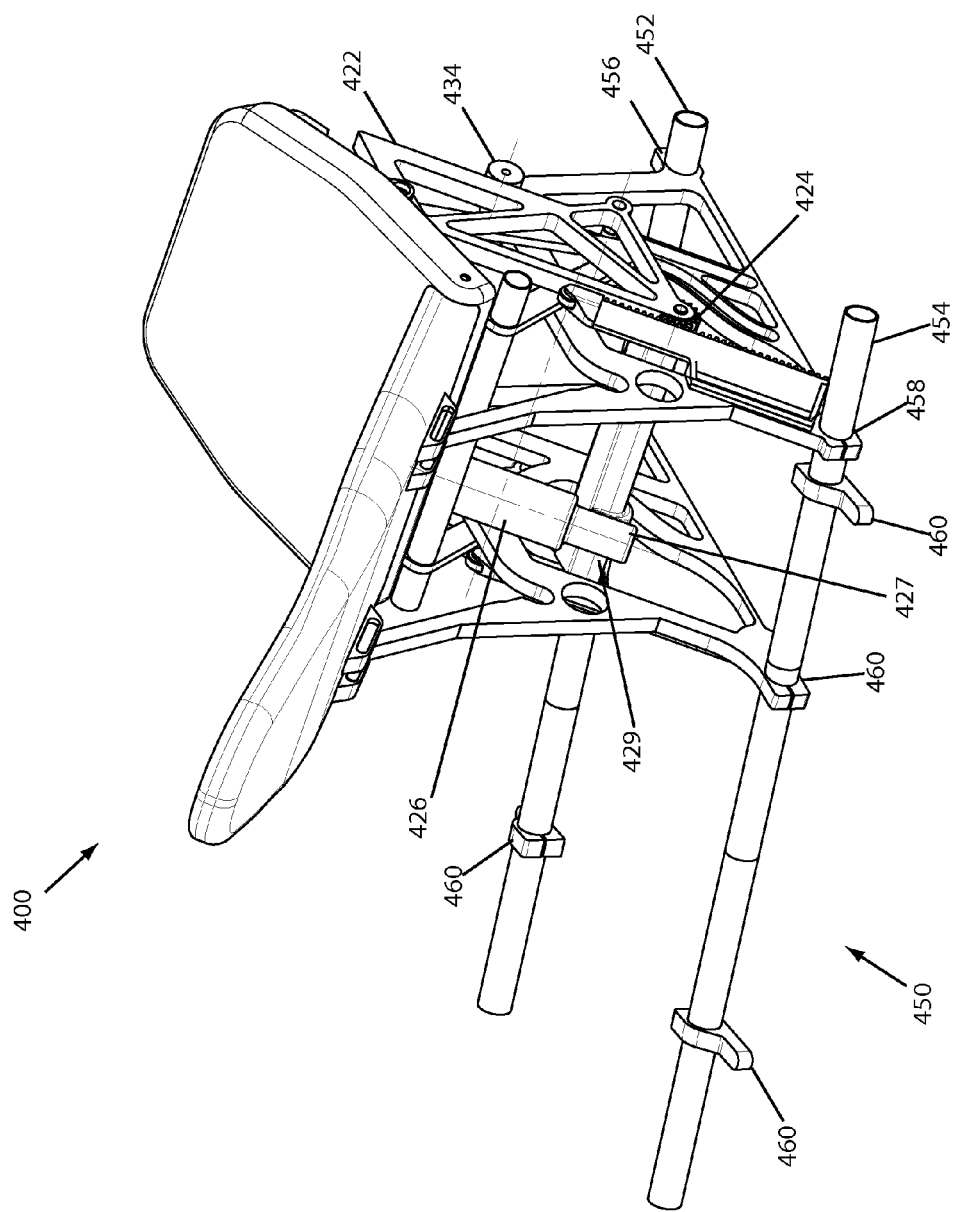
FIG. 4D depicts an example vertically translating seating assembly.

As the extension structure 422 lifts the seat pan 410, the seat back 404 and seat back support member 418 can move in relation to each other at the at the seat back pivot guide 446, which can be configured with at least one pivot path 448. FIG. 4C shows seat back support member 418 supporting the seat back 404 in a fully reclined lie-flat position at a higher height H2. In an exemplary embodiment, in a lie-flat position the seat 402 can be tilted at a cruising compensation angle θ to compensate for an aircraft nose up cruise angle. The compensation angle θ can vary but it has been found that a cruise compensation angle of 3° works well for aircraft seating arrangements. In an example arrangement, a fore-facing seat can be tilted at a compensation angle, while an aft-facing seat in a lie-flat mode is not tilted, since that would tilt an occupant's head downward, a generally undesired position. In an example embodiment, an occupant can control the translation means to achieve a desired inclination angle between and including upright and lie-flat positions. By way of example, but not limitation, a passenger can depress a button configured to control a linear actuator. In an example embodiment a vertically translating seat is configured for horizontal translation during the vertical translation process.

The vertically translatable seating assembly 400 can be coupled to a seat track mounting assembly 450. The mounting assembly 450 can be configured to secure the translating seating assembly 400 to a vehicle floor, and can comprise a front tube 452 and a rear tube 454 which can be inserted through a right front tube aperture 456, a left front aperture (not shown), and rear tube apertures 458, 460 in the frame 416. The front and rear tubes 452, 454 can be fixed to an aircraft seat track by one or more clamps 460, as known in the art.

As discussed earlier, a vertically translating seat can be incorporated in various lie-flat seating arrangements to allow overlapping of lie-flat beds in a manner that preserves passenger comfort and privacy. Exemplary arrangements, it is noted, can be configured so that seats can overlap without requiring any passenger's upper body to be in the generally undesired position of being underneath a seat of a fellow passenger. In addition, premium seating, such as adjacent center translating seats, can be arranged so that window seat passengers can exit to an aisle without having to step over a reclining passenger's upper body.

Figure 5:
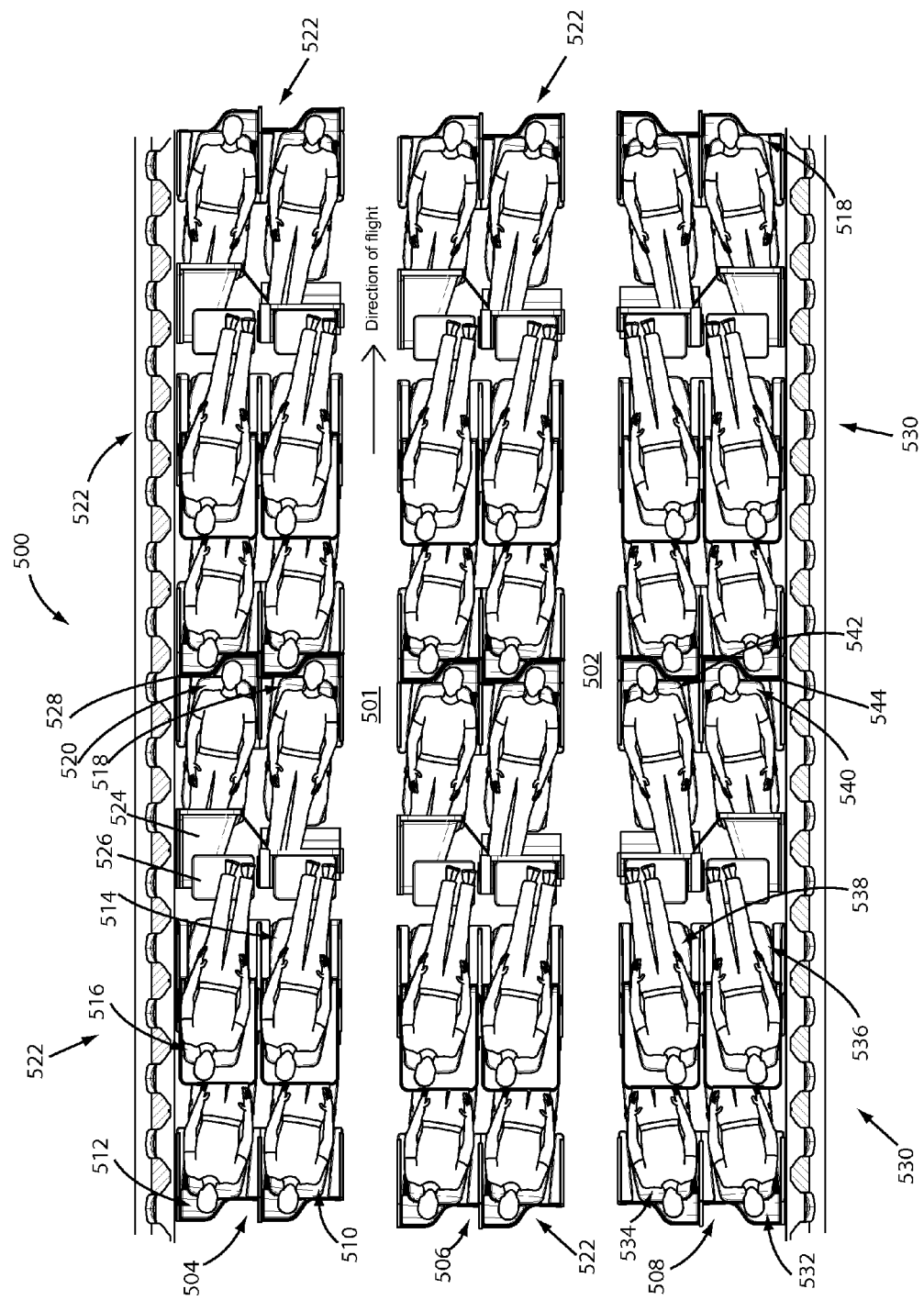
FIG. 5 depicts an example 2-2-2 seating arrangement.

FIGS. 5-9 show example high density arrangements in which multiple 3-seat or 6-seat groupings are combined and arranged across a two-aisle aircraft fuselage. Referring to FIG. 5, an example 2-2-2 seating arrangement 500 is depicted in an aircraft fuselage having a first aisle 501 and a second aisle 502 that separate a first seating column 504, a second seating column 506 and a third seating column 508. A group of 18 seats can span the width of an aircraft across the aisles 501, 502. Each seating column is two seats wide and can comprise some combination of 6-seat and/or 3-seat groupings to provide a pair of fore-facing seats 510, 512, a pair of center vertically translating seats 514, 516, and a pair of aft-facing seats 518, 520 configurable between upright and lie-flat modes.

For example, a 6-seat group 522 can comprise the seats 510-520. A plurality of groups 522 can be arranged back-to-back down the length of an aircraft fuselage to form the seating column 504. A foot compartment 524 for an aft-facing passenger is disposed to a side of a footrest 526 for a center passenger, allowing a footspace to be divided laterally between center and aft-facing passengers. A headrest divider structure 528 can be configured to separate back-to-back seating groups in a manner that allows close packing of groupings.

In this arrangement center and fore-facing seats 514, 516, 510, 512 are angled toward the aisle 501, with a majority of the seating is facing an aisle. Angled seating provides a shorter linear dimension for a grouping. The center seating column 506 can also comprise a plurality of groups 522, with fore-facing and center seats angled toward the aisle 502.

The seating column 508 can comprise a plurality of 6-seat groups 530, each comprising fore-facing seats 532, 534, center vertically translating seats 536, 538, and aft-facing seats 540, 542. The seats 532-538 can be angled toward the aisle 502. A headrest divider structure 544 can separate back-to-back seating groups of column 508. Thus an arrangement can include seating groups of variously angled orientations to maximize the number of passengers facing an aisle.

Figure 6:
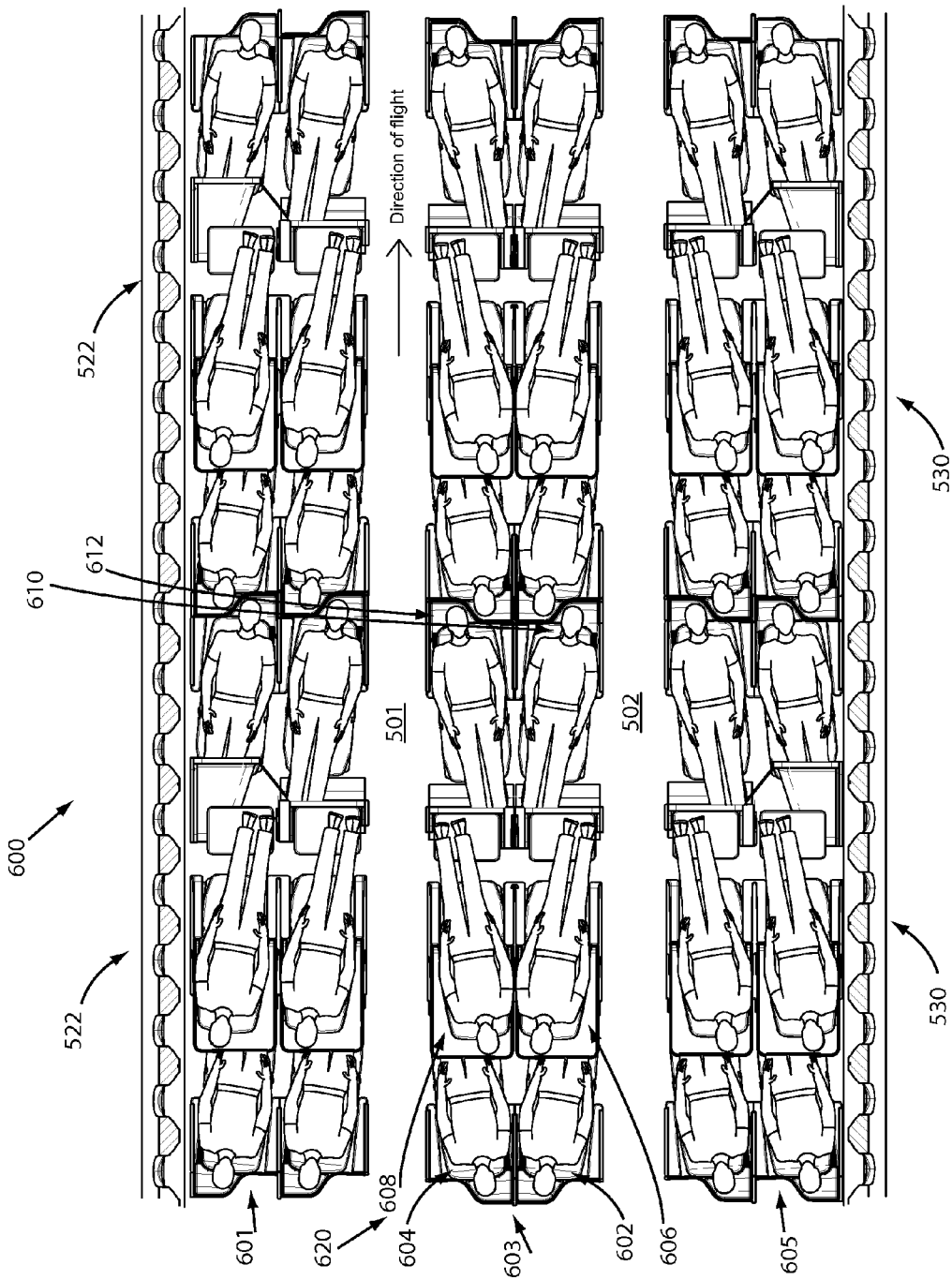
FIG. 6 depicts an example 2-2-2 seating arrangement.

FIG. 6 depicts a "mirrored" 2-2-2 arrangement 600 having a group of 18 seats spanning across the aisles 501, 502. However, rather than being parallel to each other, adjacent fore-facing seats 602, 604, adjacent vertically translating center seats 606, 608, and adjacent aft-facing seats 610, 612 in a center seating column 601 mirror each other. This arrangement provides a majority of seating facing an aisle. Seating column 603 can comprise a plurality of back-to-back 6-seat groups 522, while seating column 605 can comprise a plurality of 6-seat groups 530. Again, 3-seat groupings, 6-seat groupings, or some combination thereof can be used to form the illustrated example embodiment.

Figure 7:
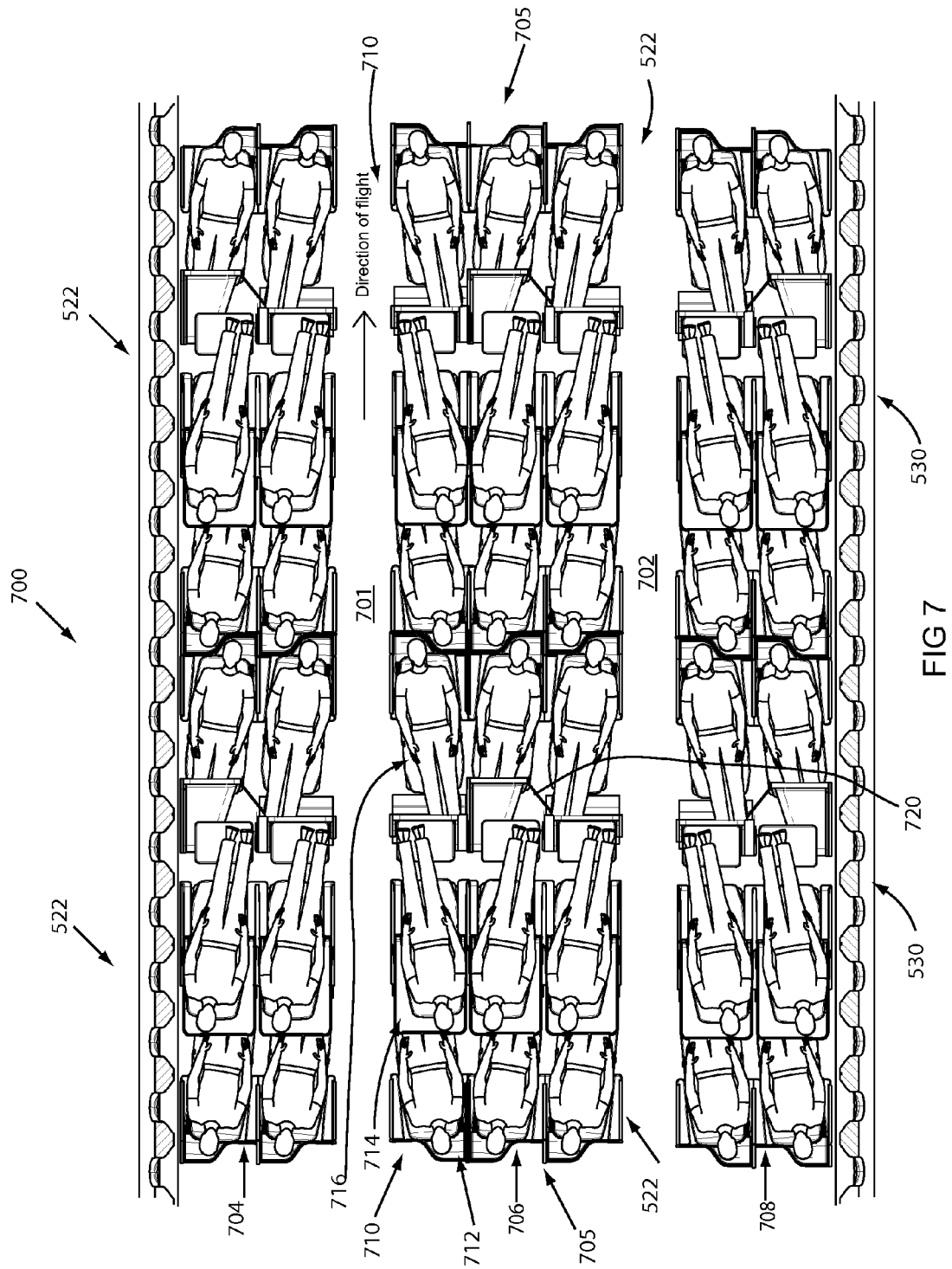
FIG. 7 depicts an example 2-3-2 seating arrangement.

FIG. 7 shows an example 2-3-2 arrangement 700 in which a group of 21 seats can span across two aisles and be disposed back to back along the length of an aircraft. Aisles 701 and 702 separate window seating column 704, center seating column 706 and window seating column 708. The seating column 704 can comprise one or more 6-seat groups 522. Seats of the seating column 704 can be angled with respect to aircraft longitudinal axis, and seats within a pair can be parallel with each other. Seats facing the direction of flight can be angled toward the aisle 701.

The seating column 708 can comprise one or more 6-seat groups 530. Seats of the column 708 can be angled with respect to aircraft longitudinal axis and seats within a pair can be parallel with each other. Seats facing the direction of flight can be angled toward the aisle 702.

The center seating column 706 comprises a 9-seat grouping 705 that is 3 seats in width. In an example embodiment, the 9-seat grouping 705 can comprise a 6-seat grouping 522 arranged adjacent a 3-seat grouping 710. In the example arrangement 700, a fore-facing seat 712, and a center translating seat 714 of the grouping 710 can be angled to face the aisle 701, while an aft-facing seat 716 of the grouping 710 can be angled to face away the aisle 701. A privacy panel 720 can be swung to an open position to allow a center passenger to exit to the aisle 702.

Figure 8:
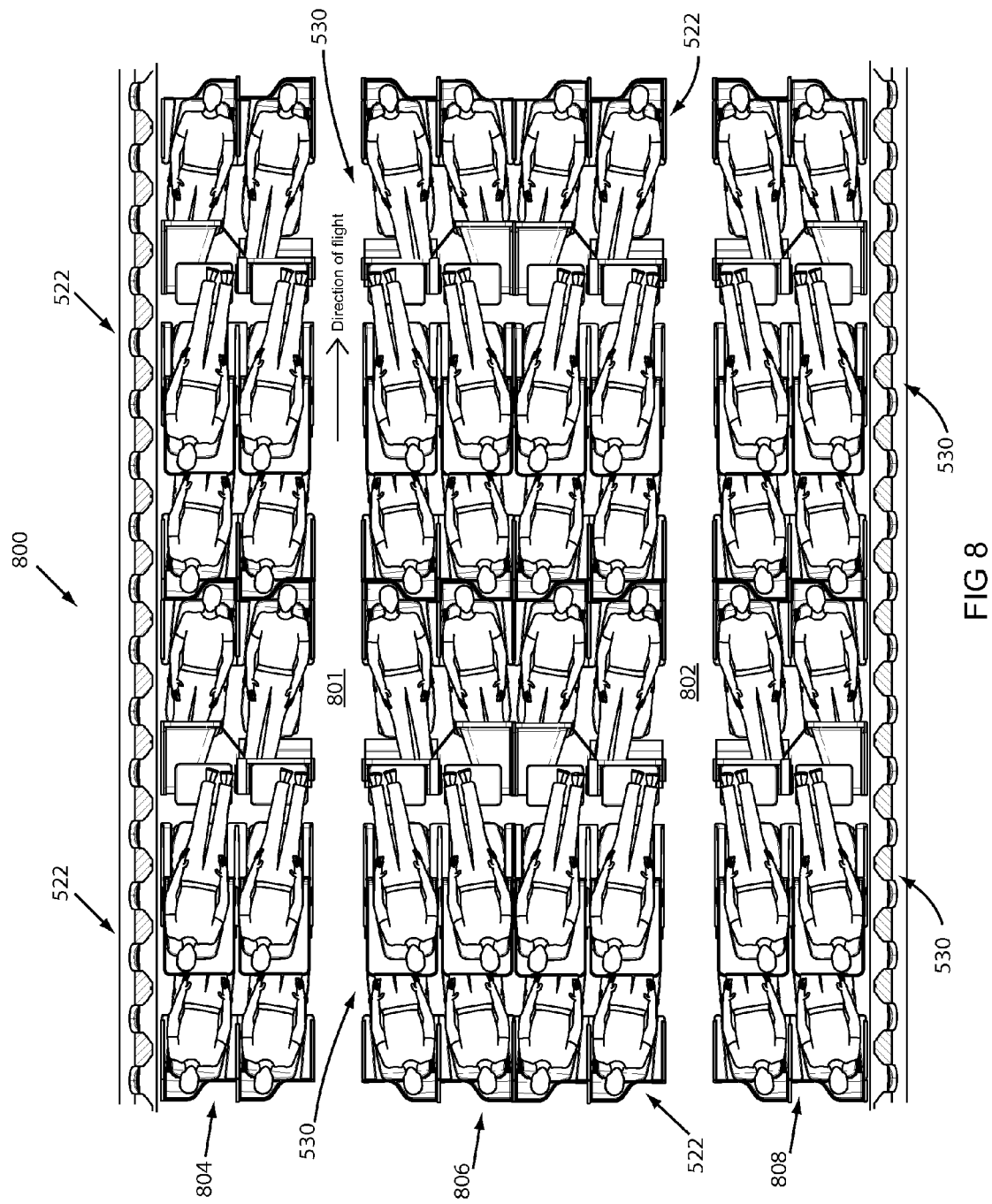
FIG. 8 depicts an example 2-4-2 seating arrangement.

FIG. 8 shows an example 2-4-2 arrangement 800 in which one or more groups of 24 seats can span the width of an aircraft and be placed back-to-back along the length of a cabin. For example, aisles 801, 802 can separate seating columns 804, 806, 808. The seating column 804 can comprise one or more 6-seat groups 522 arranged back-to-back. Similarly, the seating column 808 can comprise one or more 6-seat groups 530 arranged back-to-back. The center seating column 806 can include a 6-seat grouping 530 adjacent a 6-seat grouping 522 to provide a column that is 4 seats wide. In the example 800, a majority of seating is facing an aisle, with adjacent groups 530 and 522 arranged to mirror each other to improve aisle access for inside passengers.

Previous example arrangements included seats that are angled with respect to a cabin aisle. As discussed above, angled seats can shorten the overall linear dimension of a multi-seat grouping. However, other arrangements that include a vertically translating seat are contemplated. It is noted that in the examples shown thus far, support structures are not angled with respect to a linear cabin axis while seats themselves are. It is contemplated that support shells, footrest partitions can be angled to be aligned with angled seats. However, passenger angling can also be achieved with seats arranged parallel with the longitudinal axis of the aircraft. For example, a seat that is aligned with a cabin longitudinal axis can be configured to angle a passenger by offseting passenger footspace to a side of a bed formed by a seat in a lie-flat position.

In an example embodiment, a seating arrangement can include at least one fore-facing, aft-facing or vertically translating seating assembly in which a seat is aligned with the linear dimension of the passenger cabin. Thus, a seat can be parallel with a cabin aisle, or a vehicle's longitudinal axis, rather than angled with respect to it. Three-seat and six-seat groupings can comprise at least one non-angled seat.

Figure 9:
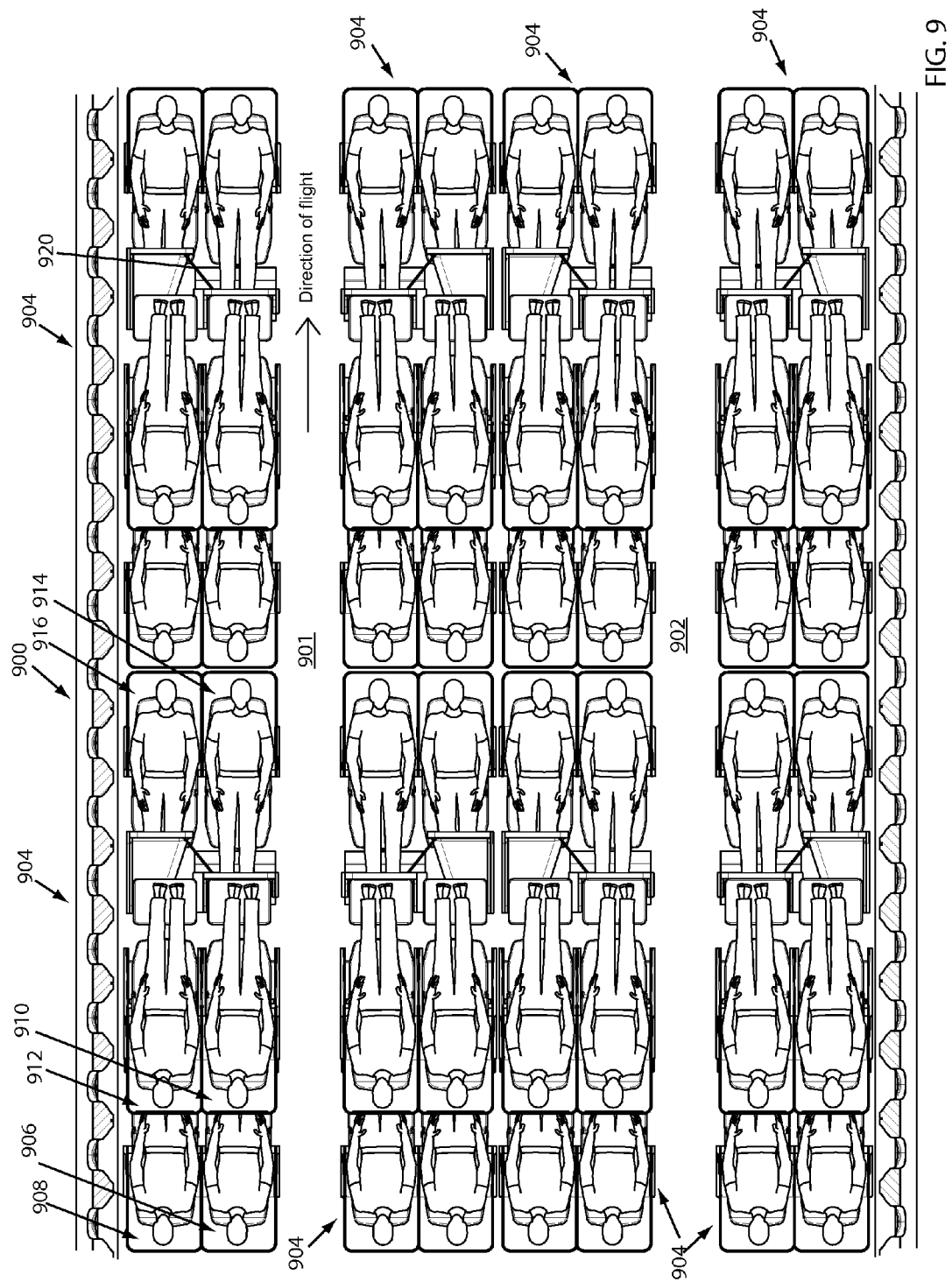
FIG. 9 depicts an example 2-4-2 seating arrangement.

FIG. 9 shows an example 900 of a "linear" 2-4-2 passenger layout arrangement in which a group of 24 seats can span the width of an aircraft fuselage. In this arrangement, seats can be aligned with a longitudinal axis of an aircraft. By way of example, a plurality of 6-seat groups 904 can be arranged to span across aisles 901, 902 and down the length of an aircraft. The grouping 904 can include a pair of fore-facing seats 906, 908, center vertically translating seats 910, 912, and aft-facing seats 914, 916. As shown in FIG. 9, seats can be parallel with aisles 901, 902, rather than being angled with respect to the aisles 901, 902. Aisle access by all seats is maintained, as a center passenger can use a privacy panel door 920 for seat ingress and egress. In an example embodiment, all seats of the group 904 can be convertible between upright an lie-flat positions.

Multiple 3-seat and 6-seat configurations with seats parallel or angled with respect to a cabin aisle can be combined in an aircraft cabin, and include mirrored and non-mirrored arrangements. It is contemplated that 1-seat or 2-seat configurations can be combined with 3-seat and 6-seat groupings to form an aircraft seating arrangement. Arrangements can include a vertically translating seat configured for elevation from a lower vertical position for take-off and landing to a higher fully reclined elevation. A vertically translating seat exploits vertical space to increase seating density without imposing higher seat track loads during take-off and landing operations. Arrangements can be configured to maximize the number of passengers facing an aisle. Fore- and aft-facing seating assemblies can be configured to underlap a raised center seat in a lie-flat position. Six-seat groupings can be configured to allow a center window passenger to exit his seat without having to cross over an upper body of a reclining passenger within the group.

Example embodiments have been presented herein for purposes of teaching the invention. Although the invention has been described with reference to non-limiting example embodiments illustrated in the attached drawings, it is noted that equivalents may be employed and substitutions made herein without departing from the scope of the invention as recited in the appended claims.

We claim:

1. A seating arrangement, comprising:
   a fore-facing seating assembly having a fore-facing seat;
   an aft-facing seating assembly having an aft-facing seat;
   a center seating assembly positioned between said fore- and aft-facing assemblies, comprising a center seat having a seat bottom configured to vertically translate upward from a lower height above a cabin floor to a higher height above said cabin floor when said center seat is converted from an upright to a lie-flat mode, wherein said seat bottom of said center seat is disposed at generally the same height above a cabin floor as a seat bottom of said fore-facing seating assembly when said center seat is configured in said upright mode and a seat of said fore-facing seating assembly is configured in an upright mode; wherein said fore-facing seating assembly, said aft-facing seating assembly and said center seating assembly are configured to form a three-seat group;
   a footrest partition structure disposed between said center seating assembly and said aft-facing seating assembly, said footrest partition structure configured with a footrest for association with said center seat when said center seat bottom is raised to said higher height, said footrest disposed at an elevated height with respect to said lower height of said seat bottom of said center seat configured in said upright mode;
   wherein said footrest partition structure is configured to cooperate with said aft-facing seating assembly configured in a lie-flat mode to provide a bed for an occupant of said aft-facing seating assembly; and
   wherein said seat bottom of said fore-facing seating assembly is not configured to translate vertically upward when said seat of said fore-facing seating assembly is moved from said upright mode to a lie-flat mode.

2. The seating arrangement of claim 1, wherein said aft-facing seating assembly comprises an aft-facing seat convertible between an upright and a lie-flat mode said aft-facing seat configured to provide head support for an occupant's head; and
   wherein when said aft-facing seating assembly is configured in said lie-flat mode, said head support is configured to support said occupant's head in a non-underlapping relationship with respect to any other lie-flat seating.

3. The seating arrangement of claim 1, wherein said footrest partition structure is configured with a footwell for association with said aft-facing seating assembly, said footwell having a tapered width and offset to a first lateral side of said footrest partition structure to direct feet of an occupant towards said first lateral side of said footrest partition.

4. The seating arrangement of claim 3, wherein said footrest for said center seating assembly is configured to cooperate with said center seat to form a bed configured to direct feet of a reclined center passenger to a second lateral side of said footrest partition structure and angle said reclined center passenger with respect to a linear dimension of said cabin; said footrest partition structure configured to accommodate feet of reclined passengers of said center seat and said aft-facing seat in a non-overlapping relationship.

5. The seating arrangement of claim 1, wherein said center seat is configured to translate horizontally while transitioning from said upright to said lie-flat mode.

6. The seating arrangement of claim 1, further comprising:
   a second fore-facing seat adjacent said fore-facing seat;
   a second aft-facing seat adjacent said aft-facing seat; and
   a second center seat positioned between said second fore-facing seat and said second aft-facing seat, adjacent said center seat.

7. The seating arrangement of claim 6, wherein at least one of said fore-facing seats is angled with respect to an aircraft longitudinal axis.

8. The seating arrangement of claim 6, wherein at least one of said aft-facing seats is aligned with an aircraft longitudinal axis.

9. The seating arrangement of claim 6, wherein at least one of said center seats is angled with respect to an aircraft longitudinal axis.

10. The seating arrangement of claim 6, wherein said partition structure is configured with an offset foot compartment having a tapered width and configured for receiving feet of an occupant of said aft-facing seat.

11. The seating arrangement of claim 10 wherein said partition structure is configured with at least one step for facilitating passenger egress.

12. The seating arrangement of claim 10, wherein said partition structure comprises a movable privacy panel for facilitating center passenger egress.

13. The seating arrangement of claim 6, wherein a seat bottom of said second center seat is configured to translate vertically upward when a seatback of said second center seat is reclined.

14. The seating arrangement of claim 1, wherein said center seating assembly comprises a center shell support structure configured to provide a footwell for receiving feet of a reclined occupant of said fore-facing seating assembly, said footwell offset to a side of said center shell support structure and configured to cooperate with said fore-facing seating assembly to angle said reclined occupant of said fore-facing seating assembly with respect to a longitudinal dimension of said cabin.

\* \* \* \* \*